US010011268B2

(12) United States Patent
Arcangeli et al.

(10) Patent No.: US 10,011,268 B2
(45) Date of Patent: Jul. 3, 2018

(54) METHOD TO CONTROL A HYBRID VEHICLE WITH A PARALLEL ARCHITECTURE AND WITH AN UNKNOWN SPEED PROFILE FOR THE OPTIMIZATION OF THE FUEL CONSUMPTION

(71) Applicant: Ferrari S.p.A., Modena (IT)

(72) Inventors: Samuele Arcangeli, Marina di Montemarciano (IT); Luca Poggio, Casalecchio di Reno (IT); Francesco Marcigliano, Maranello (IT); Andrea Balluchi, San Giovanni Valdarno (IT); Emanuele Mazzi, Viareggio (IT); Luca Arzilli, Formigine (IT)

(73) Assignee: Ferrari S.p.A., Modena (IT)

(*) Notice: Subject to any disclaimer, the term of this patent is extended or adjusted under 35 U.S.C. 154(b) by 76 days.

(21) Appl. No.: 15/254,594

(22) Filed: Sep. 1, 2016

(65) Prior Publication Data
US 2017/0088120 A1    Mar. 30, 2017

(30) Foreign Application Priority Data
Sep. 4, 2015    (IT) .................. 102015000048722

(51) Int. Cl.
 *B60W 20/15*    (2016.01)
 *B60K 6/442*    (2007.10)
 (Continued)

(52) U.S. Cl.
 CPC .............. *B60W 20/15* (2016.01); *B60K 6/24* (2013.01); *B60K 6/442* (2013.01); *B60L 11/02* (2013.01); *B60L 11/1861* (2013.01); *B60W 20/20* (2013.01); *F02D 41/04* (2013.01); *F02D 41/26* (2013.01); *B60W 2510/0638* (2013.01); *B60W 2710/0666* (2013.01); *B60W 2710/0677* (2013.01); *B60Y 2300/52* (2013.01); *B60Y 2300/91* (2013.01); *B60Y 2400/112* (2013.01); *Y10S 903/905* (2013.01)

(58) Field of Classification Search
None
See application file for complete search history.

(56) References Cited

U.S. PATENT DOCUMENTS 6,201,312 B1    3/2001  Shioiri et al.
2002/0062183 A1*  5/2002  Yamaguchi ............ B60K 6/46
                                                701/22

(Continued)

*Primary Examiner* — Jonathan M Dager
*Assistant Examiner* — Garrett F Evans
(74) *Attorney, Agent, or Firm* — Blank Rome LLP

(57) ABSTRACT

A method to control a hybrid vehicle with a parallel architecture and with an unknown speed profile, wherein the hybrid vehicle is provided with an internal combustion engine and with a reversible electrical machine connected to a storage system designed to store electrical energy; the method comprises the steps of recognizing the operating mode of the hybrid vehicle; determining a function of the specific fuel consumption of the drive system of the hybrid vehicle as a function of the operating mode of the hybrid vehicle; determining the optimal value of the power of the storage system and the optimal value of the power of the internal combustion engine, which correspond to the values that permit a minimization of said function.

9 Claims, 12 Drawing Sheets

(51) Int. Cl.
  *B60W 20/20* (2016.01)
  *B60L 11/02* (2006.01)
  *B60L 11/18* (2006.01)
  *B60K 6/24* (2007.10)
  *F02D 41/04* (2006.01)
  *F02D 41/26* (2006.01)

(56) References Cited

U.S. PATENT DOCUMENTS

2005/0107193 A1* 5/2005 Frank .................. F16H 9/18
  474/8
2015/0006001 A1  1/2015 Kawata et al.

* cited by examiner

METHOD TO CONTROL A HYBRID VEHICLE WITH A PARALLEL ARCHITECTURE AND WITH AN UNKNOWN SPEED PROFILE FOR THE OPTIMIZATION OF THE FUEL CONSUMPTION

TECHNICAL FIELD

The invention relates to a method to control a hybrid vehicle with a parallel architecture and with an unknown speed profile for the optimization of the fuel consumption.

PRIOR ART

There is an ever increasing production of hybrid vehicles with a parallel architecture comprising an internal combustion engine, which transmits a torque to the drive wheels by means of a servo-assisted transmission provided with a servo-assisted mechanical gearbox, and at least one electrical machine, which is electrically connected to an electrical storage system and is mechanically connected to a shaft of the transmission.

The electrical machine usually is a reversible electrical machine, namely it can act both as an engine by absorbing electrical energy and by generating mechanical work and as a generator by absorbing mechanical work and by generating electrical energy, and it is controlled by an inverter, which is connected to the electrical storage system, which is designed to store electrical energy.

For hybrid vehicles with a parallel architecture, there is a strong need to reduce the emissions of carbon dioxide of the internal combustion engine, i.e. to reduce fuel consumptions, though without jeopardizing the performances of the hybrid vehicle. In other words, manufacturers aim to optimize the cumulative fuel consumption of the internal combustion engine, making sure, at the same time, that the drive wheels receive the driving torque needed to fulfil the drive requests of the driver.

SUMMARY OF THE INVENTION

The object of the invention is to provide a method to control a hybrid vehicle with a parallel architecture for the optimization of the cumulative fuel consumption with an unknown speed profile, which does not suffer from the drawbacks of the prior art and is easy and cheap to be implemented.

According to the invention, there is provided a method to control a hybrid vehicle with a parallel architecture for the optimization of the cumulative fuel consumption with an unknown speed profile according to the appended claims.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
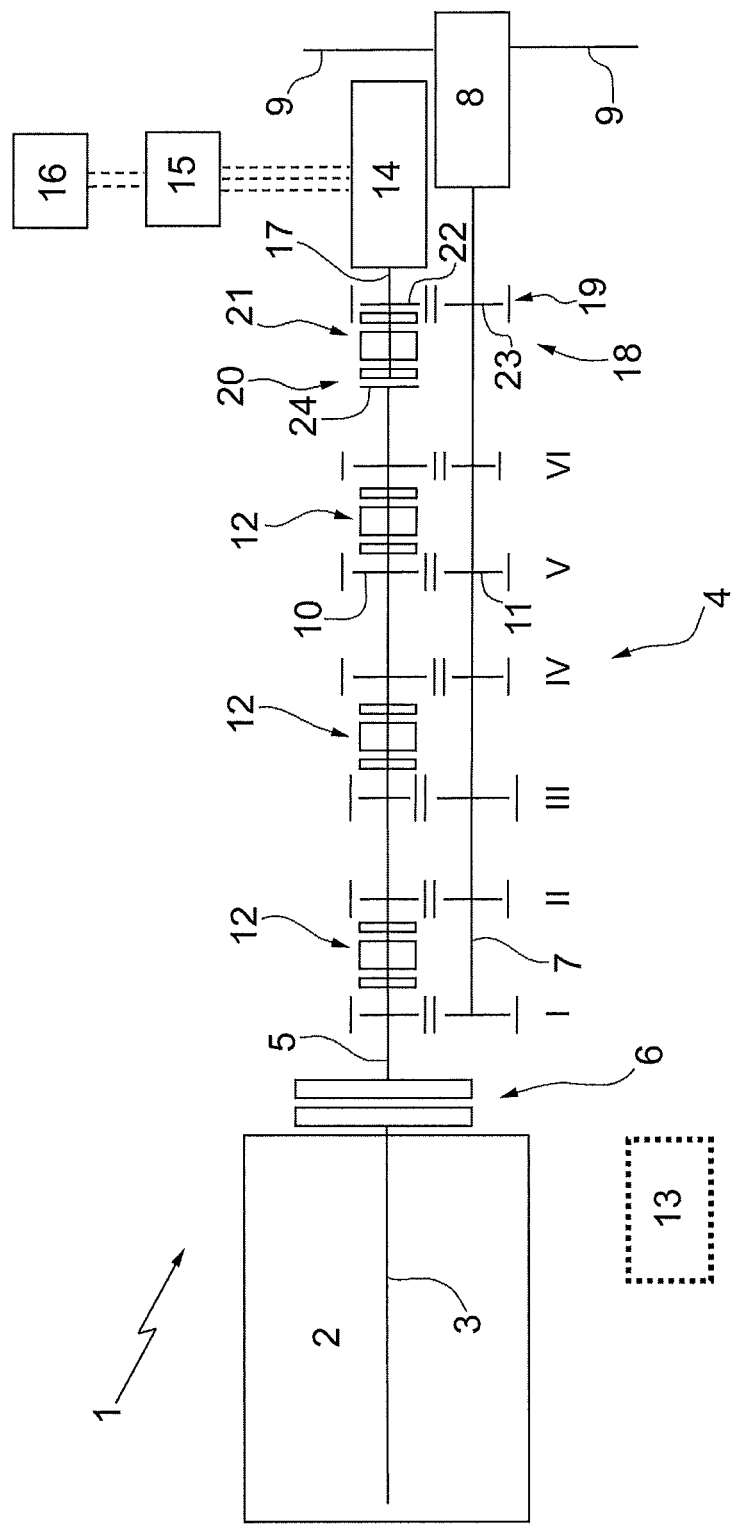
FIG. 1 is a schematic view of a hybrid vehicle implementing the control method according to the invention.

In the accompanying drawings numeral 1 indicates, as a whole, a servo-assisted transmission for a hybrid vehicle driven by an internal combustion engine 2, which is provided with a drive shaft 3 rotating at an angular speed. In particular it is a vehicle with a hybrid drive and a parallel architecture.

The servo-assisted transmission 1 comprises a servo-assisted mechanical gearbox 4, which is provided with a primary shaft 5, which rotates at an angular speed and can be connected to the drive shaft 3 by means of a servo-assisted clutch 6, and with a secondary shaft 7, which rotates at an angular speed and is connected to a differential 8, which transmits the motion to the drive wheels by means of two axle shafts 9.

The servo-assisted mechanical gearbox 4 shown in FIG. 1 comprises six forward gears indicated with Roman numerals (first gear I, second gear II, third gear III, fourth gear IV, fifth gear V and sixth gear VI). The primary shaft 5 and the secondary shaft 7 are mechanically coupled to one another by a plurality of pairs of gears, each defining a respective gear and comprising a primary gear 10 fitted on the primary shaft 5 and a secondary gear 11 fitted on the secondary shaft 7.

Each primary gear 10 is mounted idle on the primary shaft 5 and always meshes with the respective secondary gear 11; on the other hand, each secondary gear 11 is splined to the secondary shaft 7 so as to rotate with the secondary shaft 7 itself in an integral manner. Furthermore, the servo-assisted mechanical gearbox 4 comprises three synchronizers 12, each of which is mounted coaxial to the primary shaft 5, is arranged between two primary gears 10, and is suited to be operated so as to alternatively fit the two primary gears 10 to the primary shaft 5 (i.e. so as to alternatively cause the two primary gears 10 to become angularly integral to the primary shaft 5). In other words, each synchronizer 12 can be moved in one direction to fit a primary gear 10 to the primary shaft 5, or it can be moved in the other direction to fit the other primary gear 10 to the primary shaft 5.

The servo-assisted mechanical gearbox 4 is operated by a hydraulic servo-commando in order to control the synchronizers 12 so as to engage and disengage the gears; the servo-assisted clutch 6 is operated by a hydraulic servo-command, as well, so as to connect and disconnect the drive shaft 3 to and from the primary shaft 5. The servo-assisted transmission 1 comprises a control unit 13, which controls the hydraulic servo-commands of the servo-assisted mechanical gearbox 4 and of the servo-assisted clutch 6.

Furthermore, the servo-assisted transmission 1 comprises a reversible electrical machine 14 (which means that it can act both as an engine by absorbing electrical energy and by generating mechanical work and as a generator by absorbing mechanical work and by generating electrical energy), which is controlled by an electrical actuator 15, which is connected to at least one battery 16, which is designed to store electrical energy.

The reversible electrical machine 14 comprises a shaft 17, which is integral to a rotor of the reversible electrical machine 14, is normally idle (i.e. not mechanically connected in a permanent manner either to the primary shaft 5 or the secondary shaft 7), and can be mechanically connected to the primary shaft 5.

The servo-assisted transmission comprises a connection device (18), which is designed to connect the shaft 17 of the reversible electrical machine 14 to the primary shaft 5 of the servo-assisted mechanical gearbox 4, or to connect the shaft 17 of the reversible electrical machine 14 to the secondary shaft 7 of the servo-assisted mechanical gearbox 4, or to maintain the shaft 17 of the reversible electrical machine 14 idle (i.e. not connected either to the primary shaft 5 or the secondary shaft 7).

According to the preferred embodiment shown in the accompanying drawings, the connection device 18 comprises a gear transmission 19, which is interposed between the shaft 17 of the reversible electrical machine 14 and the secondary shaft 7 of the servo-assisted mechanical gearbox 4, a direct drive transmission 20, which is interposed between the shaft 17 of the reversible electrical machine 14 and the primary shaft 5, and a synchronizer 21, which is designed to alternatively engage the gear transmission 19 or the direct drive transmission 20.

The gear transmission 19 preferably has a non-even gear ratio and comprises a gear 22, which is mounted idle on the shaft 17 of the reversible electrical machine 14, and a gear 23, which is splined on the secondary shaft 7 and permanently meshes with the gear 22; the synchronizer 21 is designed to fit the gear 22 to the shaft 17 of the reversible electrical machine 14 and to connect the shaft 17 of the reversible electrical machine 14 to the secondary shaft 7. The direct drive transmission 20 has an even gear ratio and comprises a connection element 24, which is splined on the primary shaft 5; the synchronizer 21 is designed to fit the connection element 24 to the shaft 17 of the reversible electrical machine 14 and to connect the shaft 17 of the reversible electrical machine 14 to the primary shaft 5.

Below you can find a description of the control mode implemented by the control unit 13 to optimize the cumulative fuel consumption of the hybrid vehicle. In particular, the control mode described below is aimed at optimizing the operation of the of the reversible electrical machine 14 in order to minimize the consumption of fuel of the internal combustion engine 2. In particular, the control mode can be implemented in case the speed profile of the hybrid vehicle is known beforehand (off-line mode, implemented, for example, to carry out optimization analyses on homologation cycles or on race courses), or, alternatively, in case the speed profile is not known beforehand (on-line mode).

Below you can find a description of the control mode implemented by the control unit 13 to optimize the cumulative fuel consumption of the hybrid vehicle with a speed profile of the vehicle known beforehand (off-line mode).

Figures 2, 3:
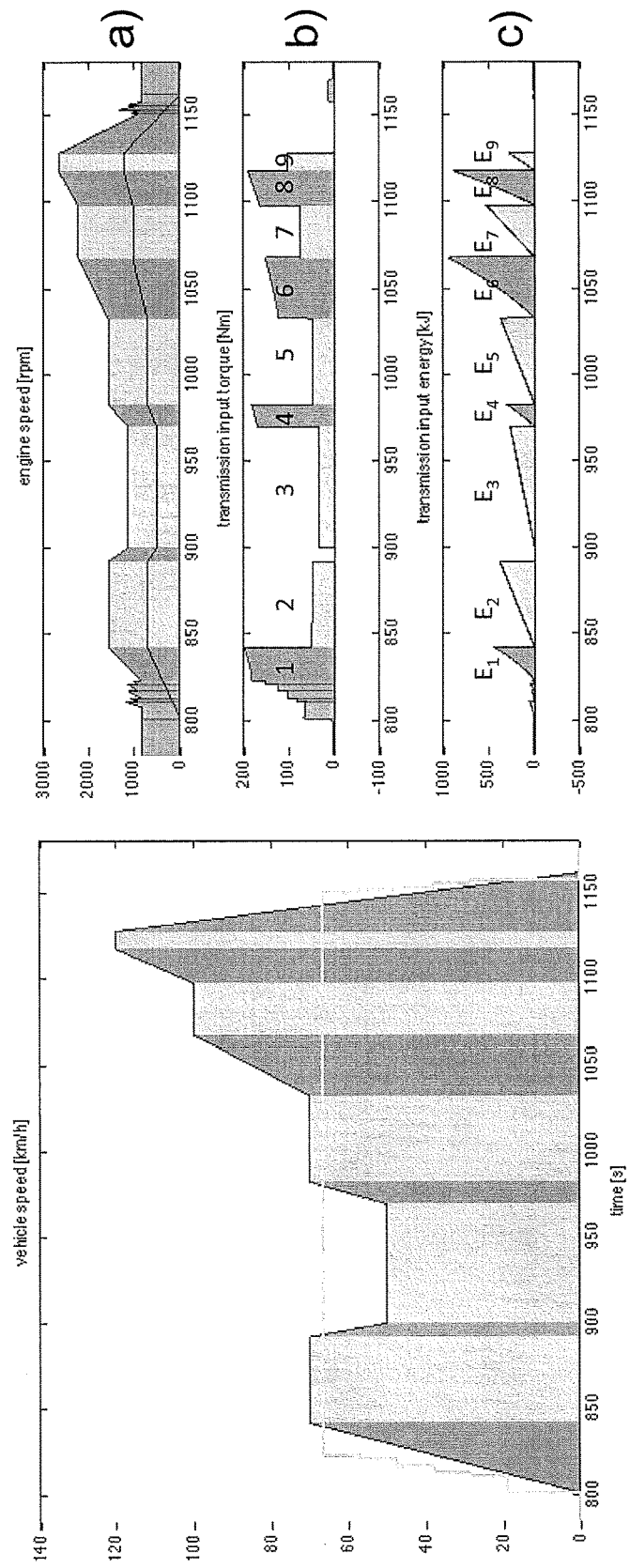
FIG. 2 shows a known speed profile of the hybrid vehicle of FIG. 1.
FIG. 3 shows the development of some physical quantities of the transmission relating to the speed profile of the vehicle of FIG. 2.

According to FIG. 2, for each actuation cycle, the known speed profile of the hybrid vehicle is divided into a number of intervals; each interval represents a section of the known speed profile of the hybrid vehicle at a constant speed or, alternatively, with a constant acceleration or also with a constant deceleration. According to FIG. 3a, given the profile in time of the engaged gear, the known speed profile in FIG. 2 produces the corresponding profile of the angular speed (rpm) of the shaft 3 of the internal combustion engine 2. Assuming instantaneous gear shifts, the obtained angular speed profile of the internal combustion engine 2 is divided, in turn, into intervals with sections at a constant angular speed or, alternatively, with a constant angular acceleration or, also, with a constant angular deceleration. From each interval of the partition of the known vehicle speed profile, you can obtain a division of the known angular speed profile of the internal combustion engine 2 into a number of intervals equal to the number of gears engaged in the same time frame. In the description below, explicit reference will be made of the partition in intervals of the angular speed profile of the shaft 3 of the internal combustion engine 2. Supposing to operate with the sole internal combustion engine 2 (in other words, without using the contribution of the reversible electrical machine 14), given a model of the vehicle, you can obtain the torque to the shaft 3 of the internal combustion engine 2, which is suited to produce the drive needed to execute the known speed profile shown in FIG. 2. FIG. 3b shows the driving torque $\tau_i$ for each interval of the defined partition. Finally, according to FIG. 3c, in each one of said intervals, you can obtain the cumulative energy $E_i$ generated by the internal combustion engine 2 to produce the execution of the known vehicle speed profile: the energy values $E_i$ correspond to the peaks of the signal shown in FIG. 3 in the area of the upper extreme of the i-th interval. It is evident how, for example, in the intervals representing a section of the known speed profile of the hybrid vehicle with a constant deceleration there is a generation of a zero driving torque $\tau_i$ to be transmitted to the driving wheels and the generated energy $E_i$ is equal to zero, as well. Furthermore, said intervals of the partition of the speed profile of the shaft 3 of the internal combustion engine clearly have different durations $\Delta_i$ (based on the known speed profile of the hybrid vehicle and on the gear shift profile).

The torque profiles $\tau_i$ and the energy values $E_i$ obtained for the internal combustion engine 2 result from the known vehicle speed profile in case the reversible electrical machine 14 is not used. The use of the reversible electrical machine 14 allows you to obtain the execution of the known speed profile of the hybrid vehicle, changing the torque profiles $\tau_i$ and the energy values $E_i$ of the internal combustion engine so as to optimize the operation thereof.

Therefore, the control unit 13 is designed to optimize the generation of the energy $E_i$ by the internal combustion engine 2 in said intervals of an actuation cycles, namely to determine the energy values $E_i$ that optimize the operation of the internal combustion engine 2 obtaining a minimization of the cumulative fuel consumption for the known speed profile of the vehicle. Furthermore, in the "charge saving" control mode implemented by the control unit 13, the state of charge SOC of the battery 16 at the end of the actuation cycle must be equal to the state of charge SOC of the battery 16 at the beginning of the actuation cycle; in other words, the control mode implemented by the control unit 13 in an actuation cycle must be transparent for the state of charge SOC of the battery 16. Vice versa, in the "charge exhaustion" control mode, the state of charge SOC of the battery 16 at the end of the actuation cycle must be brought to the minimum admissible value. Finally, in the "complete charge" control mode, the state of charge SOC of the battery 16 at the end of the actuation cycle must be brought to the maximum admissible value.

First of all, the control unit 13 is designed to optimize the generation of the energy $E_i$ in the single periods, namely to determine the torque profile $\tau_i$ for the internal combustion engine 2 that permits a minimization of the cumulative fuel consumption in the i-th interval, producing the requested energy $E_i$. However, two cases can occur: a first case in which the interval refers to a section of the known speed profile of the hybrid vehicle (i.e. angular speed of the shaft 3 of the internal combustion engine 2) at a constant speed or, alternatively, a second case in which the interval refers to a section of the known speed profile of the hybrid vehicle (i.e. angular speed of the shaft 3 of the internal combustion engine 2) with a constant acceleration.

Figure 4:
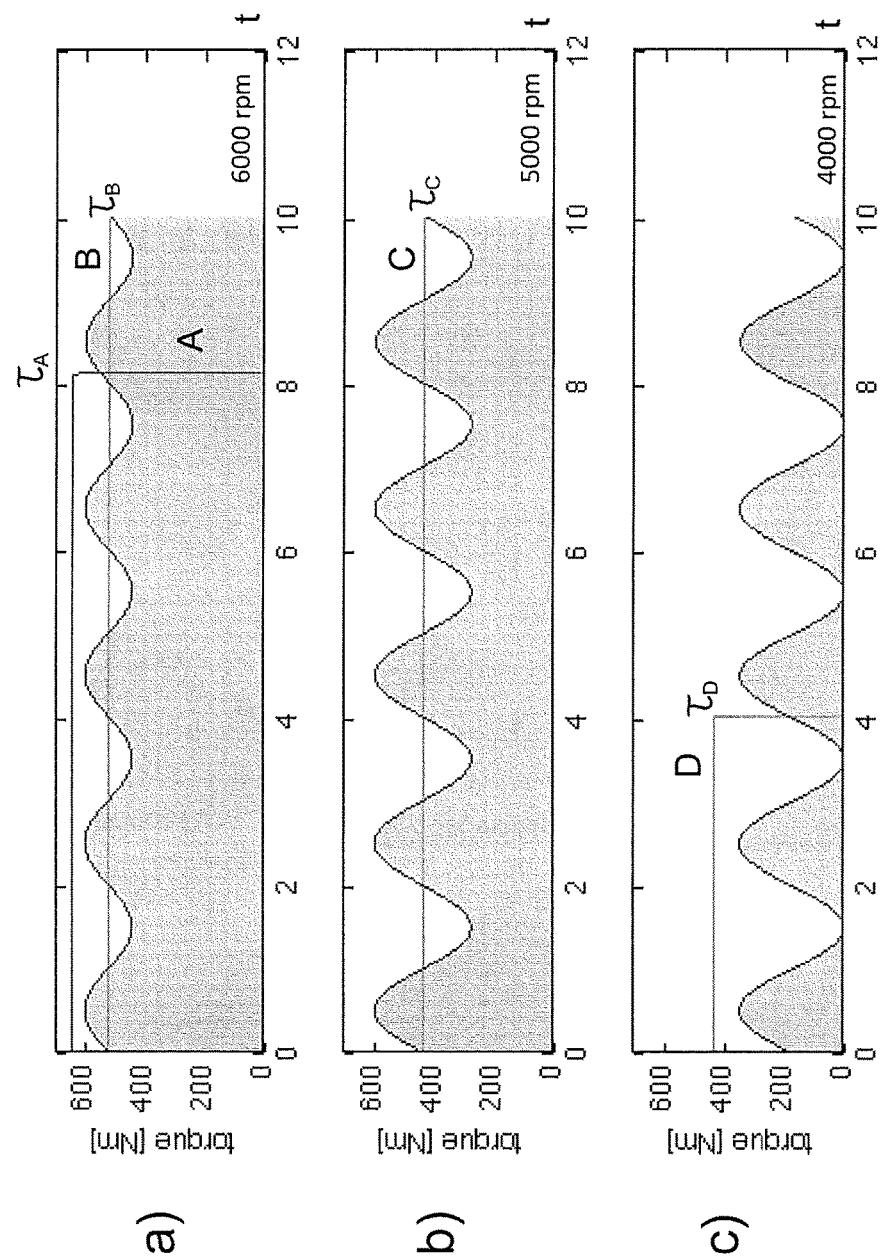
FIG. 4 shows hypothetical developments of the driving torque delivered in sections with a constant speed of the profile of FIG. 2.

The case in which the interval represents a constant speed section of the known angular speed profile of the shaft 3 of the internal combustion engine 2 is shown in FIG. 4. In particular, FIG. 4 shows torque profiles $\tau_i$ of the internal combustion engine 2, for the i-th interval with a time duration $\Delta_i$ of 10 seconds, for three values of constant angular speed (i.e. 6000, 5000 and 4000 rpm) for the shaft 3 of the internal combustion engine 2. In the i-th time interval with time duration $\Delta_i$, it is possible to generate the same energy $E_i$ with different torque profiles $\tau_i$ of the internal combustion engine 2: the torque profile that minimizes the fuel consumption within the i-th interval (in which the speed of the shaft 3 is constant), is constant at times.

In particular, the control unit is configured to determine the development of the torque constant at times to be transmitted by the internal combustion engine 2 to the drive wheels in the i-th reference interval, so as to generate the energy $E_i$ and optimize (i.e. minimize), within the same interval, the cumulative fuel consumption of the internal combustion engine 2.

Figure 5:
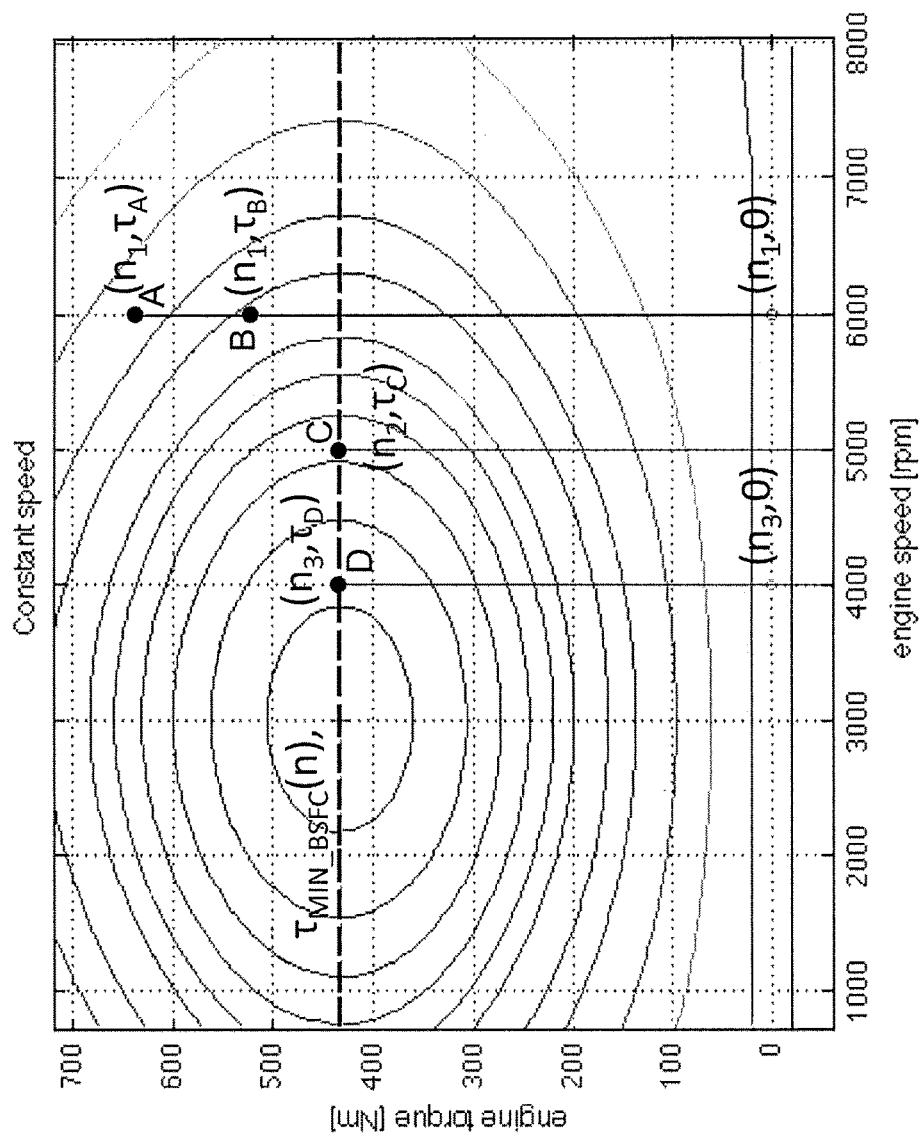
FIG. 5 shows a diagram, in the engine speed (rpm)/engine torque plane, of the development of the specific fuel consumption used to optimize the different developments shown in FIG. 4.

FIG. 5 shows, in the angular speed (rpm)/driving torque plane of the internal combustion engine 2, a sheaf of curves, which identify portions of the plane with the specific fuel consumption (also known as Brake Specific Fuel Consumption—BSFC) of the internal combustion engine 2.

Let's consider, for example, case a) in FIG. 4, where the constant angular speed $n_1$ of the internal combustion engine 2, expressed as number of revolutions (rpm), is equal to 6000 rpm. FIG. 4a shows, in grey, an oscillatory development of the engine torque, which produces a given energy $E_1$ in the interval, but is not optimal in terms of cumulative fuel consumption over the interval itself. Furthermore, two developments A and B of the driving torque are shown, which produce the same energy $E_1$ as the oscillatory torque profile: the development A is constant at times, assumes a value of the driving torque $\tau_A$ that is fairly high during the first eight seconds and a value of the driving torque TA that is equal to zero during the last two seconds, which is associated with a fuel consumption that is equal to zero, as well; the development B is represented by a constant value of the driving torque $\tau_B$ over the entire interval. In FIG. 5, the torque developments A and B of FIG. 4a are represented by the section $(n_1,\tau_A)$-$(n_1,0)$ and by the point $(n_1,\tau_B)$, respectively. The torque development B, which, in FIG. 5 corresponds to the point $(n_1,\tau_B)$, for which the specific fuel consumption is minimum, given the same energy $E_1$ produced at the engine speed $n_1$ of 6000 rpm, has a smaller cumulative fuel consumption than the torque development A and the oscillatory torque; as a matter of fact, the development B corresponds to the optimal operation of the internal combustion engine 2, in terms of minimization of the cumulative fuel consumption, for the delivery of the energy $E_1$ at the angular speed of 6000 rpm.

In case b) of FIG. 4, the constant angular speed $n_2$ of the internal combustion engine 2, expressed as number of revolutions (rpm), is equal to 4000 rpm. The driving torque development C is constant over the entire interval with a duration of ten seconds and corresponds to the value of driving torque $\tau_C$ having the minimum value of specific fuel consumption for the angular speed of 4000 rpm: point $(n_2,\tau_C)$ in FIG. 5. Therefore, the development C of FIG. 4b is the one leading to the minimum cumulative fuel consumption for the generation of the corresponding energy $E_2$. Finally, in case c) of FIG. 4, the constant angular speed $n_3$ of the internal combustion engine is equal to 3000 rpm. The oscillatory torque represented in grey has low values and produces a small contribution of energy $E_3$. The application of the torque value $\tau_D$, for which the specific consumption BSFC is minimum at 3000 rpm, for the entire duration of the interval could produce an energy value grater than the value $E_3$. Said energy value, instead, is produced by minimizing the cumulative fuel consumption with the development D constant at times in FIG. 4c, which consists of the value of optimal driving torque $\tau_D$ in the first four seconds and of a value of zero driving torque for the last six seconds.

Generally speaking, given a development of the specific fuel consumption BSFC of the internal combustion engine 2 in the speed/engine torque domain, for each engine speed value, the engine torque value is determined, for which the minimum value of specific consumption BSFC is obtained at the given engine speed: the optimal engine load torque can be expressed as a function of the engine speed n, $\tau_{MIN\_BSFC}(n)$ and defines a curve $MIN_{BSFC}$ in the speed/engine torque domain. In the example shown in FIG. 5, the curve $MIN_{BSFC}$ consists of the line indicated with $MIN_{BSFC}$, which corresponds to the value of constant driving torque $\tau_{MIN\_BSFC}(n)$ equal to approximately 430 Nm regardless of the engine speed n.

Supposing that the internal combustion engine 2 needs to generate the energy $E_i$, in the i-th interval with a time duration $\Delta_i$, during which the speed of the shaft 3 of the internal combustion engine 2 is constant at value $n_i$, expressed in revolutions per minute and considering the energy $E_0$ corresponding to the engine torque maintained constant at the value $\tau_{MIN\_BSFC}(n_i)$ during the i-th interval, for the minimization of the cumulative fuel consumption in the i-th interval, the internal combustion engine 2 is controlled by the control unit so as to produce the torque $\tau_{OPT\_SP}$ defined as follows:

1) if the torque $E_i$ is smaller than the torque $E_0$, the internal combustion engine 2 delivers the optimal torque $\tau_{MIN\_BSFC}(n_i)$ for a fraction of the i-th interval with a duration equal to $(E_i/E_0)\Delta_i$ an delivers a zero driving torque, which is associated with a fuel consumption that is equal to zero, as well, in the remaining part of the i-th interval (see case c of FIG. 4);

2) if the torque $E_i$ is equal to the torque $E_0$, the internal combustion engine 2 delivers the optimal torque $\tau_{MIN\_BSFC}(n_i)$ for the entire duration $\Delta_i$ of the i-th interval (see case b of FIG. 4);

3) if the torque $E_i$ is greater than the torque $E_0$, the internal combustion engine 2 delivers the constant torque equal to $E_0/((\pi/30)n_i\Delta_i)$ for the entire duration $\Delta_i$ of the i-th interval (see case a of FIG. 4), namely in case the specific fuel consumption BSFC for the speed $n_i$ has one or more local minimum points, a torque value constant at times in correspondence to which the fuel consumption is minimized and the energy $E_i$ is delivered.

The energy $E_0$ corresponding to the torque maintained constant at the value $\tau_{MIN\_BSFC}(n_i)$ during the i-th interval can be expressed as follows:

$$E_0 = (\pi/30) n_i \tau_{MIN\_BSFC}(n_i) \Delta_i \qquad [1]$$

The specific fuel consumption BSFC of the internal combustion engine is calculated through the ratio between the fuel flow rate fed to the internal combustion engine 2 and the corresponding power delivered. The concept applied to the single engine points can be extended, defining the mean specific fuel consumption BSFC of the internal combustion engine 2 through the ratio between the mean fuel flow rate $G_E^*$ and the mean power P* delivered. The mean power P* delivered, in turn, is determined through the ratio between the energy E* produced and the duration of the reference time interval $\Delta^*$. The optimal driving torque $\tau_{OPT\_SP}$, defined as above, which permits the optimization of the cumulative fuel consumption of the internal combustion engine 2 for a given value of engine speed $n_i$ and of energy $E_i$ to be generated in the reference time interval $\Delta_i$, which corresponds to a mean power $E_i/\Delta_i$, also optimizes the cumulative fuel consumption of the internal combustion engine 2, for the same angular speed $n_i$, in any other interval j corresponding to the same mean power $E_j/\Delta_j$. As a matter of fact, under the action of the optimal driving torque $\tau_{OPT\_SP}$, the mean specific consumption BSFC of the internal combustion engine 2 is a function of the sole mean power $P_i = E_i/\Delta_i$, besides being a function of the value of the angular speed $n_i$, which is constant in the interval. Therefore, the action of the optimal driving torque $\tau_{OPT\_SP}$ permits an optimization of the mean specific consumption BSFC of the internal combustion engine 2 for any value of energy $E_j$ to be generated over any time interval $\Delta_j$, which correspond to the same mean power $P_j = E_j/\Delta_j$ requested.

Hence, the control unit 13 is designed to determine the minimum mean specific fuel consumption $BSFC_{MIN}$ of the internal combustion engine 2 in the reference time interval $\Delta_i$ as a function of the constant angular speed $n_i$ expressed as number of revolutions (rpm) and of the mean power $P_i$ requested.

The reversible electrical machine 14 is controlled by the control unit 13 so as to generate a torque on the shaft 17, which produces, on the shaft 3 of the internal combustion engine 2, the load condition defined by the optimal torque $\tau_{OPT\_SP}$ and, at the same time, fulfils the drive request of the drive wheels deriving from the speed profile of the hybrid vehicle. By so doing, the internal combustion engine achieves the minimum cumulative fuel consumption operating at the minimum mean specific duel consumption BSFC. In other words, the reversible electrical machine 14 is controlled by the control unit 13 so as to generate a torque contribution to the shaft 17 of the transmission, which is such as to compensate the request for driving torque to the wheels deriving from the speed profile of the hybrid vehicle, adding an additional positive or negative contribution, which causes the internal combustion engine 2 to produce the optimal torque, hence minimizing the cumulative fuel consumption.

Figure 6:
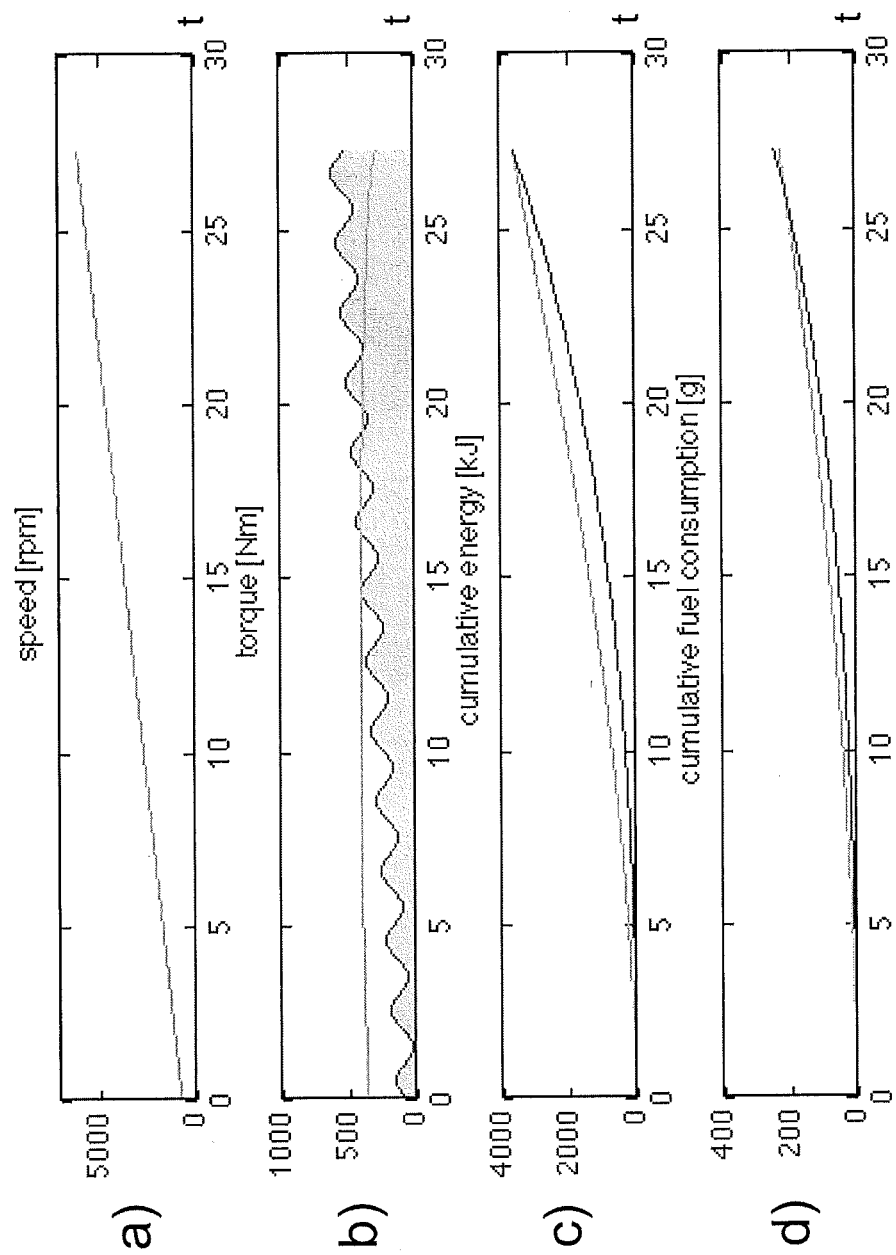
FIG. 6 shows the developments of different physical quantities of the internal combustion engine as a function of the speed (rpm) in a section with a constant acceleration of the profile of FIG. 2.

On the other hand, the case in which the interval corresponds to a section of the known speed profile of the hybrid vehicle with a constant acceleration is shown in FIG. 6. FIG. 6a shows the development of the angular speed of the shaft 3 of the internal combustion engine 2, which rotates with a given constant angular acceleration. FIG. 6b shows the profile of the driving torque τ to be transmitted to the drive wheels within an i-th reference time interval, with a duration $\Delta_i$ of 27 seconds. Within the i-th reference interval, it is possible to generate the same energy $E_i$ with a different profile of the torque τ of the internal combustion engine 2, which permits an optimization (i.a. minimization) of the cumulative fuel consumption of the internal combustion engine 2 during the i-th reference interval.

In particular, the control unit 13 is designed to determine the profile of the torque τ to be delivered by the internal combustion engine 2 in order to generate the requested energy $E_i$ in the i-th reference time interval of a duration $\Delta_i$ and optimize the cumulative fuel consumption of the internal combustion engine 2. The fuel flow rate $G_E$ is expressed as follows:

$$G_E(\omega,\tau) = (N/4\pi) * q_E(\omega,\tau) * \omega \qquad [2]$$

$G_E$ fuel flow rate, expressed in kg/second;
$q_E$ mass of fuel burnt for each cylinder of the internal combustion engine 2, expressed in kg;
ω angular speed of the internal combustion engine 2, expressed in radians per second;
τ driving torque delivered by the internal combustion engine 2, expressed in Nm; and
N number of cylinders of the engine
Hence:

$$M(\omega, \tau) = -\frac{\frac{\delta^2 q_E}{\delta\tau\delta\omega}(\omega,\tau)}{\frac{\delta^2 q_E}{\delta\tau^2}(\omega,\tau)} \qquad [3]$$

wherein $q_E$, ω and τ have the same meaning as the one described above for equation [2].

Applying Pontryagin's maximum principle, we can establish that the profile of the torque of the internal combustion engine 2 that permits the generation of the requested energy $E_i$ in the i-th reference interval with said duration $\Delta_i$, optimizing—namely minimizing—the cumulative fuel consumption of the engine over the time interval, must fulfil the equation:

$$\frac{d\tau}{d\omega} = M(\omega, \tau) \qquad [4]$$

wherein ω and τ have the same meaning as the one described above for equation [2]. Along the profiles for which the cumulative fuel consumption is minimized, the infinitesimal variations of engine torque are proportional to the infinitesimal variations of engine speed, as the nonlinear function M defined in [3] is the proportionality constant.

Figure 7:
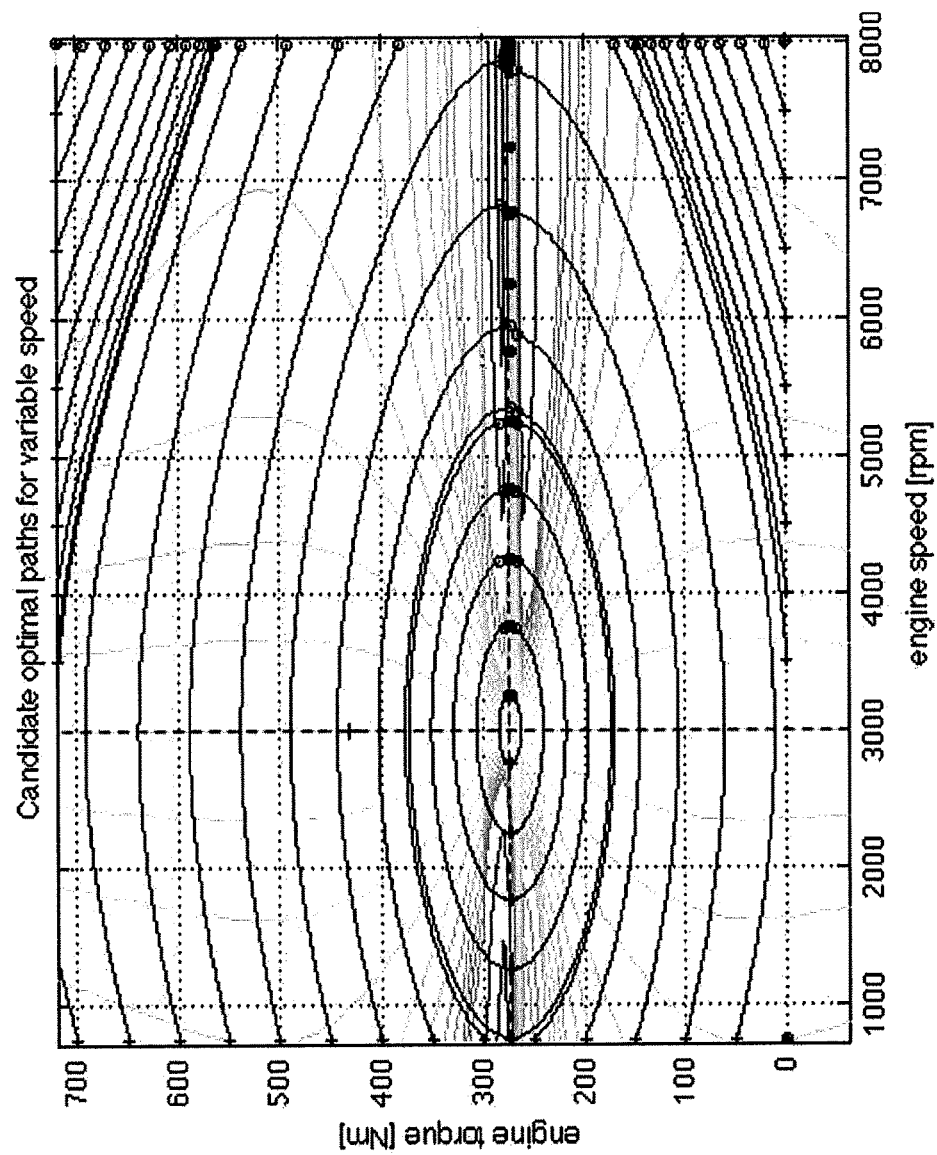
FIG. 7 shows a family of trajectories, in the engine speed (rpm)/engine torque plane, used to optimize the different developments shown in FIG. 6.

FIG. 7 shows, in the engine speed (expressed in rpm)/ engine torque τ (expressed in Nm) plane, the development of the function M introduced in [3] corresponding to the specific fuel consumption BSFC function shown in FIG. 5 and the family of trajectories that minimize the cumulative fuel consumption of the internal combustion engine 2 obtained in accordance with [4] when the internal combustion engine is subjected to a constant angular acceleration of the shaft 3. In the optimal solution for the driving torque $\tau_{OPT\_AC}$, similarly to what we described in the first case, the diving torque can be delivered in accordance with [4] for the entire duration of the time interval or for a portion thereof, applying a zero driving torque in the remaining portion, which is associated with a zero fuel consumption.

It is known that the specific fuel consumption BSFC of an internal combustion engine 2 is calculated through the ratio between the fuel flow rate and the power delivered in stationary working points. The concept applied to the single engine points can be extended, defining the mean specific fuel consumption BSFC of the engine through the ratio between the mean fuel flow rate $G_E^*$ and the mean power $P^*$ requested. As it is known, the mean power $P^*$ requested, in turn, is determined through the ratio between the energy $E^*$ to be produced and the reference time interval $\Delta^*$. In this case, again, the driving torque $\tau_{OPT\_AC}$, which, in accordance with [4], permits an optimization of the cumulative fuel consumption of the internal combustion engine 2, when the angular speed of the engine varies with a constant acceleration from the value $n_i^1$ to the value $n_i^2$, for a given value of energy $E_i$ to be generated in the reference time interval $\Delta_i$ corresponding to a mean power $E_i/\Delta_i$, also optimizes the cumulative fuel consumption of the internal combustion engine 2, for the same extremes of angular speed $n_i^1$ and $n_i^2$, in any other interval j corresponding to the same mean power $E_j/\Delta_j$. As a matter of fact, under the action of the optimal driving torque $\tau_{OPT\_AC}$, the mean specific consumption BSFC of the internal combustion engine 2 is a function of the sole mean power $P_i=E_i/\Delta_i$, besides being a function of the extreme values of the angular speed $n_i^1$ and $n_i^2$. Therefore, the action of the optimal driving torque $\tau_{OPT\_AC}$ permits an optimization of the mean specific consumption BSFC of the internal combustion engine 2 for any value of energy $E_j$ to be generated over any time interval $\Delta_j$, which correspond to the same mean power $P_i=E_i/\Delta_i$ requested.

Hence, the control unit 13 is designed to determine the minimum mean specific fuel consumption $BSFC_{MIN}$ of the internal combustion engine 2 in the reference time interval $\Delta_i$ as a function of the extreme values of the angular speed $n_i^1$ and $n_i^2$ expressed in rpm, which varies with a constant acceleration, and of the mean power $P_i$ requested.

The reversible electrical machine 14 is controlled by the control unit 13 so as to generate a torque on the shaft 17, which produces, on the shaft 3 of the internal combustion engine 2, the load condition defined by the optimal torque $\tau_{OPT\_AC}$ and, at the same time, fulfils the drive request of the drive wheels deriving from the speed profile of the hybrid vehicle. By so doing, the internal combustion engine achieves the minimum cumulative fuel consumption operating at the minimum mean specific duel consumption BSFC. In other words, the reversible electrical machine 14 is controlled by the control unit 13 so as to generate a torque contribution to the shaft 17 of the transmission, which is such as to compensate the request for driving torque to the wheels deriving from the known speed profile of the hybrid vehicle, adding an additional positive or negative contribution, which causes the internal combustion engine 2 to produce the optimal torque, hence minimizing the cumulative fuel consumption.

To sum up, the optimal driving torque $\tau_{OPT}$ for the internal combustion engine 2, which permits a minimization of the cumulative fuel consumption over the known speed profile of the hybrid vehicle, is given by the torque $\tau_{OPT\_SP}$ in the sections with a constant angular speed and by the torque $\tau_{OPT\_AC}$ in the sections with a constant angular acceleration of the internal combustion engine 2. When calculating the optimal driving torque $\tau_{OPT}$ for the internal combustion engine 2, the control unit 13 is designed to take into account the performance limits of the internal combustion engine 2, of the reversible electrical machine 14 and of the battery 16 as a function of their operating point.

Therefore, in the first case, in which the i-th time interval represents a section of the known speed profile of the internal combustion engine 2 with a constant angular speed, the minimum mean specific fuel consumption $BSFC_{MIN}$ of the internal combustion engine 2 in the reference time interval can be expressed in this way:

$$BSFC_{MIN}(P_i, n_i^1) \quad [5]$$

$P_i$ power requested in the i-th reference time interval with a duration $\Delta_i$; and $n_i^1$ angular speed of the internal combustion engine 2 constant in the i-th reference time interval.

In the second case, in which the i-th time interval represents a section of the known speed profile of the internal combustion engine 2 with a constant angular acceleration, the minimum mean specific fuel consumption $BSFC_{MIN}$ and the fuel flow rate $G_E$ of the internal combustion engine 2 in the reference time interval can be expressed in this way:

$$BSFC_{MIN}(P_i, n_i^1, n_i^2) \quad [6]$$

$$G_E(P_i, n_i^1, n_i^2) \quad [7]$$

$P_i$ power requested in the i-th reference time interval with a duration $\Delta_i$;

$n_i^1$ initial angular speed of the internal combustion engine 2 in the i-th reference time interval; and $n_i^2$ angular speed of the internal combustion engine 2 at the end of the i-th reference time interval.

For each actuation cycle with a known speed profile of the hybrid vehicle, you can obtain a known profile of angular speed for the internal combustion engine 2, which is divided into time intervals representing sections of the profile with a constant angular speed or with a constant acceleration; the optimal distribution of the mechanical energy $E_i$ of the internal combustion engine 2 in each one of said time intervals is obtained by solving the following problem of global minimization over the entire time frame of the actuation cycle of the known speed profile of the hybrid vehicle $$\min \sum_i FC_i(E_i) \quad [8]$$

wherein $FC_i(E_i)$ indicates the cumulative fuel consumption in the i-th time interval under the action of the optimal driving torque $\tau_{OPT}$, which is obtained by multiplying the minimum mean specific fuel consumption indicated in [5] and [6] for the energy $E_i$. The cumulative fuel consumption $FC_i(E_i)$ depends on the sole energy values $E_i$ subjected to the optimization, besides depending on the known parameters of angular speed of the internal combustion engine 2 with a constant value or at the two extremes of the time interval.

The optimization in [8] of the cumulative fuel consumption over the entire time frame of the actuation cycle is subjected to conditions concerning the state of charge SOC of the battery 16 at the end of the actuation cycle, which depend on the storage management mode implemented by the control unit. In the "charge saving" control mode, the state of charge SOC of the battery 16 at the end of the actuation cycle must be equal to the initial state of charge SOC; in the "charge exhaustion" control mode, the state of charge SOC of the battery 16 at the end of the actuation cycle must be brought to the minimum admissible value. Finally, in the "complete charge" control mode, the state of charge SOC of the battery 16 at the end of the actuation cycle must be brought to the maximum admissible value. The state of charge SOC of the battery at the end of the actuation cycle depends on possible electrical loads supplied with power by the battery 16, besides depending on the energy cumulatively absorbed by the reversible electrical machine 14.

Furthermore, in order to restrict the search for the optimal solution for the problem [8] of minimization of the cumulative fuel consumption, further conditions are introduced, which limit, at the top and at the bottom, the unknown energy $E_i$ values depending on the power that can be delivered by the reversible electrical machine 14 and on the capacity as well as voltage of the battery 16.

Below you can find a description of the control mode implemented by the control unit 13 to optimize the cumulative fuel consumption of the internal combustion engine in case the speed profile of the hybrid vehicle is not known beforehand (on-line mode).

Figure 8:
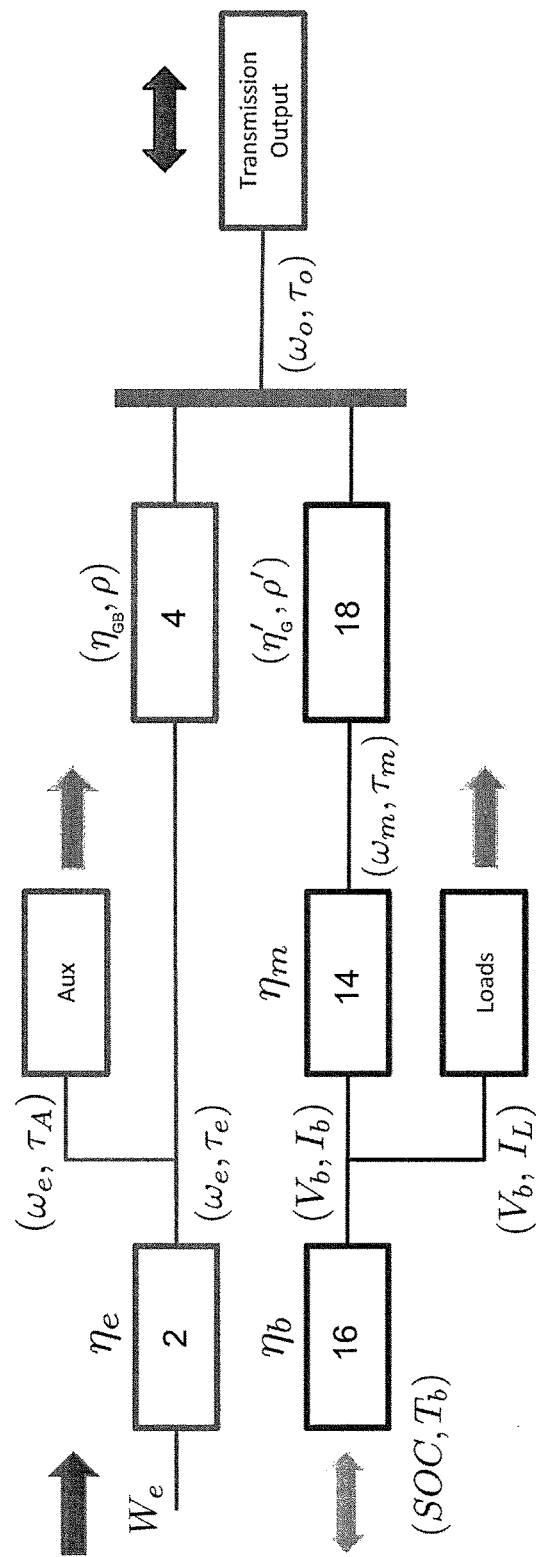
FIG. 8 is a schematic view of the servo-assisted transmission of the vehicle of FIG. 1.

FIG. 8 schematically shows the servo-assisted transmission, wherein the internal combustion engine 2 rotates at an angular speed $\omega_E$ and delivers a driving torque $\tau_E$. The internal combustion engine is further characterized by an efficiency $\eta_E$ and absorbs a power $W_E$. The internal combustion engine 2 is connected to auxiliary mechanical loads AUX, which also rotate at an angular speed $\omega_E$ equal to the angular speed $\omega_E$ of the internal combustion engine 2 and absorb a driving torque $\tau_{AUX}$. The internal combustion engine 2 is connected to a servo-assisted mechanical gearbox 4, which, in turn, is characterized by an efficiency $\eta_{GB}$.

In FIGS. 8 to 13, the "Reduction" block corresponds to the connection device 18 indicated in FIG. 1; whereas the "Transmission Output" block corresponds to the differential 8 in FIG. 1.

On the other hand, the battery 16, which is suited to store electrical energy, is characterized by an efficiency $\eta_B$, by a state of charge SOC and by a temperature Tb, and supplies power to the reversible electrical machine 14 with a voltage $V_b$. The battery 16, which is suited to store electrical energy, is manufactured so as to supply power to the further electrical loads LOADS of the hybrid vehicle with the same voltage $V_b$ supplied to the reversible electrical machine 14 and a current $I_L$. The battery 16 delivers, as a whole, a current $I_b$ to supply power to the reversible electrical machine 14 and the electrical loads LOADS.

The reversible electrical machine 14 is characterized by an efficiency $\eta_M$, rotates at an angular speed $\omega_M$ and delivers a driving torque $\tau_M$. The reversible electrical machine 14 is connected to a connection device 18 characterized by an efficiency $\eta_G$. Finally, the elements at the output of the servo-assisted transmission (indicated with Transmission Output) rotate at an angular speed $\omega_O$ and absorb a driving torque $\tau_O$.

Furthermore, the following quantities are defined:

$G_E$ fuel flow rate of the internal combustion engine, function of the angular speed $\omega_E$ and of the driving torque $\tau_E$;

$P_E$ power of the internal combustion engine, given by the product of the angular speed $\omega_E$ and of the driving torque $\tau_E$;

$P_O$ power of the output of the servo-assisted transmission, given by the product of the angular speed $\omega_O$ and of the driving torque $\tau_O$;

$P_A$ power of the auxiliary loads AUX of the hybrid vehicle, given by the product of the angular speed $\omega_E$ and of the driving torque $\tau_A$;

$P_L$ power of the electric loads LOADS of the hybrid vehicle, given by the product of the voltage $V_b$ and of the current $I_L$;

$P_M$ power of the reversible electrical machine 14, given by the product of the angular speed $\omega_M$ and of the driving torque $\tau_M$; and finally $P_B$ total power of the single cells making up the battery 16, which is given by the product of the voltage $V_b$, of the current $I_b$ and of the efficiency $\eta_b$ in case the current $I_b$ is smaller than zero (i.e. in case the reversible electrical machine 14 operates as a generator by absorbing mechanical work and by generating electrical energy); and by the product of the voltage $V_b$, of the current $I_b$ and of the inverse of the efficiency $\eta_b$ in case the current $I_b$ is greater than or equal to zero (i.e. in case the reversible electrical machine 14 operates as an engine by absorbing electrical energy and by generating mechanical work).

Figure 9:
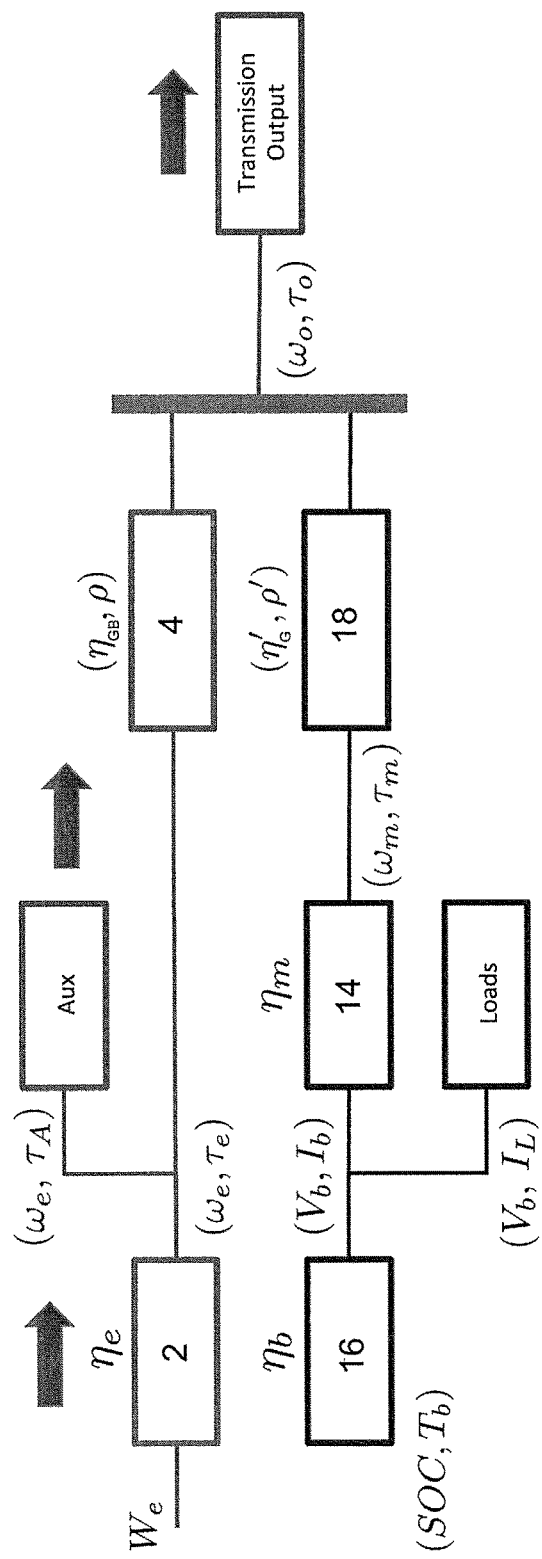
FIGS. 9 to 13 schematically show different operating modes of the servo-assisted transmission of FIG. 8.

Taking into account the sole contribution of the internal combustion engine 2 and of the auxiliary loads according to FIG. 9, the specific fuel consumption BSFC of the internal combustion engine 2 for a given value of the power $P_E$ of the internal combustion engine 2 is defined as:

$$BSFC(P_E) = \frac{G_E(\omega_E, \tau_E)}{P_E} \qquad [9]$$

wherein $G_E$, $\omega_E$, $\tau_E$ and $P_E$ have the meaning described above.

On the other hand, the specific fuel consumption BSFC of the auxiliary loads AUX and of the output of the servo-assisted transmission for a given value of the power $P_O$ of the output of the servo-assisted transmission is defined as $$BSFC_{PWT}(P_O) = \frac{G_E(\omega_E, \tau_E(\tau_A, \tau_O))}{P_A + P_O} \qquad [10]$$

wherein $G_E$, $\omega_E$, $I_E$, $P_O$ and $P_A$ have the meaning described above and the driving torque $\tau_E$ is determined as a function of the driving torque $\tau_A$ and of the driving torque $\tau_O$.

With reference to the efficiency of the internal combustion engine 2, the optimal power $P_E$ corresponds to the value $P_E^*$ that permits a minimization of the specific fuel consumption BSFC defined in [9]. Similarly, with reference to the efficiency of the internal combustion engine 2 coupled to the servo-assisted transmission, the optimal power $P_O$ at the output of the servo-assisted transmission corresponds to the value $P_O^*$ that permits a minimization of the specific fuel consumption $BSFC_{PWT}$ defined in [9]. In this case, the corresponding optimal power value $P_E^*$ for the internal combustion engine 2 is, in general, different from the optimal value determined minimizing [9].

Figure 10:
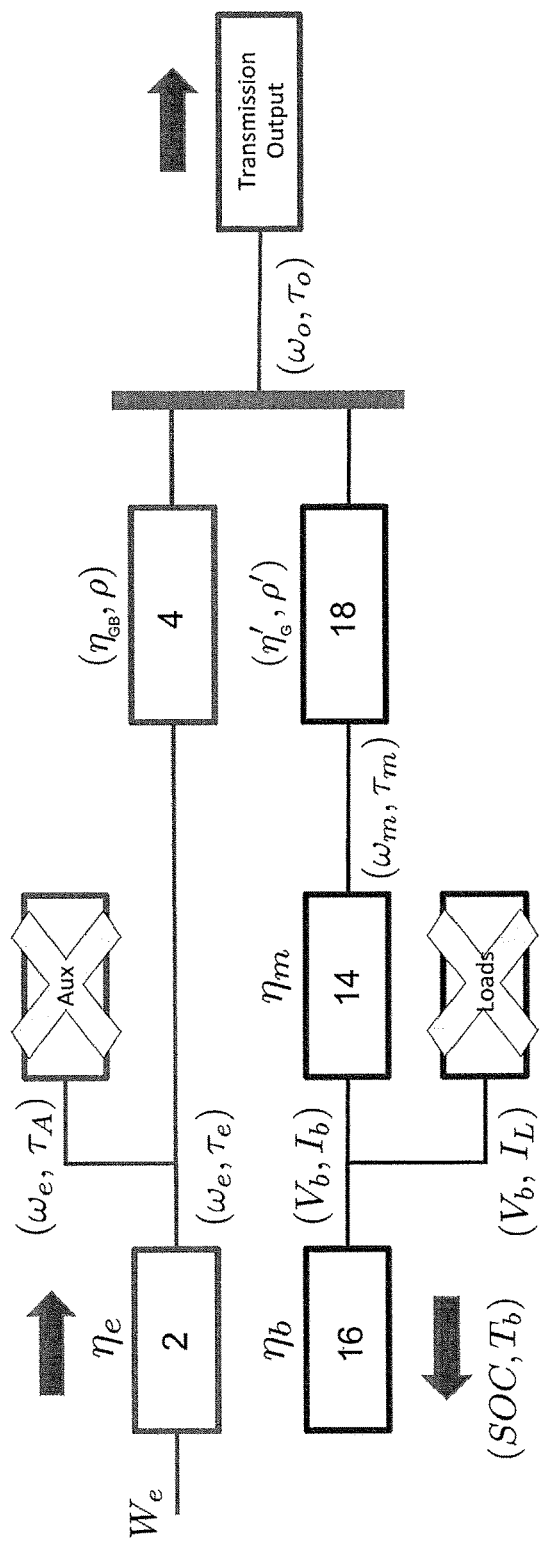

According to FIG. 10, on the other hand, taking into account the contribution of the internal combustion engine 2 and of the reversible electrical machine 14 operating as a generator by absorbing mechanical work and by generating electrical energy and ignoring the contribution of the auxiliary loads AUX and of the further electrical loads LOADS, the specific fuel consumption $BSFC_{CHR}$ for the charge of the battery 16 during the drive is defined as:

$$BSFC_{CHR}(P_B, P_O) = \frac{G_E(\omega_E, \tau_E(\tau_O, I_B^{CHR}))}{P_O - P_B} \qquad [11]$$

wherein $G_E$, $\omega_E$, $P_O$, $\tau_E$, $\tau_O$ and $P_B$ have the meaning described above and the driving torque $\tau_E$ is determined as a function of the driving torque $\tau_O$ and of the current $I_b$. In this case, the current $I_b$ is smaller than zero, as the reversible electrical machine 14 operates as a generator by absorbing mechanical work and by generating electrical energy. In particular, the power $P_B$, given by the product of the voltage $V_b$, of the current $I_b$ and of the efficiency $\eta_M$, is smaller than zero.

The optimal value $P_B^*$ of the charge power $P_B$ of the battery 16 corresponds to the value that permits a minimization of the function [11] for a given value of the power $P_O$ of the output of the servo-assisted transmission. In correspondence to the optimal charge power $P_B^*$, you obtain the optimal power value $P_E^*$ for the internal combustion engine 2 for the charge of the battery 16 during the drive with power $P_O$ delivered.

Figure 11:
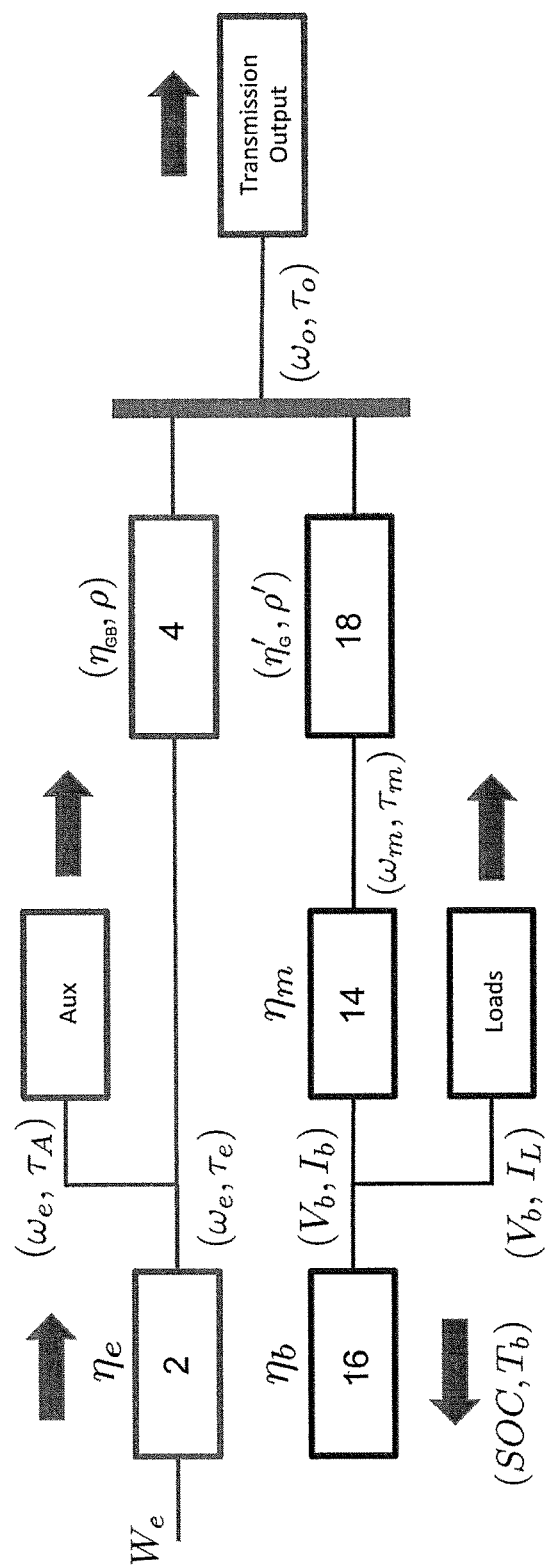

According to FIG. 11, on the other hand, taking into account the contribution of the internal combustion engine 2 and of the reversible electrical machine 14 operating as a generator by absorbing mechanical work and by generating electrical energy and taking into account the contribution of the auxiliary loads AUX and of the further electrical loads LOADS, the specific fuel consumption $BSFC_{CHR}$ for the charge of the battery 16 during the drive is defined as:

$$BSFC_{CHR}(P_B, P_O) = \frac{G_E(\omega_E, \tau_E(\tau_O, \tau_A, I_L, I_B^{CHR}))}{P_A + P_O + P_L - P_B} \quad [12]$$

wherein $G_E$, $\omega_E$, $P_O$, $\tau_E$, $\tau_A$, $\tau_O$, $P_A$, $P_L$, $I_L$ and $P_b$ have the meaning described above. The driving torque $\tau_E$ is determined as a function of the driving torque $\tau_O$, of the driving torque $\tau_A$, of the current $I_L$ and of the current $I_b$ (in this case, the current $I_b$ is smaller than zero, since the reversible electrical machine 14 operates as a generator by absorbing mechanical work and by generating electrical energy).

The optimal value $P_B^*$ of the charge power $P_B$ of the battery 16 corresponds to the value that permits a minimization of the function [12] for a given value of the power $P_O$ of the output of the servo-assisted transmission. In correspondence to the optimal charge power $P_B^*$, you obtain the optimal power value $P_E^*$ for the internal combustion engine 2 for the charge of the battery 16 during the drive with power $P_O$ delivered.

Figure 12:
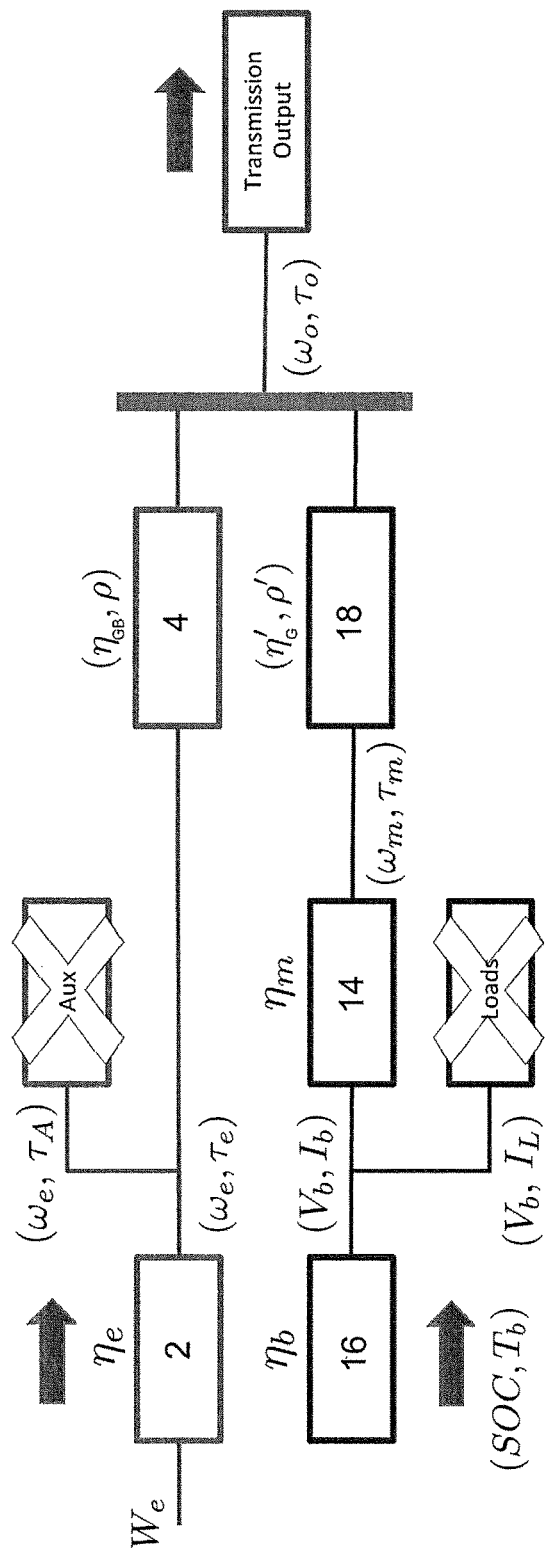

According to FIG. 12, on the other hand, taking into account the contribution of the internal combustion engine 2 and of the reversible electrical machine 14 operating as an engine by absorbing electrical energy and by generating mechanical work and ignoring the contribution of the auxiliary loads AUX and of the further electrical loads LOADS, the specific fuel consumption $BSFC_{DCHR}$ for the discharge of the battery 16 during the drive is defined as:

$$BSFC_{DCHR}(P_B, P_O) = \frac{G_E(\omega_E, \tau_E(\tau_O, I_B^{CHR}))}{P_O - \eta_G \eta_M \eta_B P_B} \quad [13]$$

wherein $G_E$, $\omega_E$, $P_O$, $\eta_M$, $\eta_G$, $\eta_B$, $\tau_E$, $\tau_O$ and $P_B$ have the meaning described above and the driving torque $\tau_E$ is determined as a function of the driving torque $\tau_O$ and of the current $I_b$. In this case, the current $I_b$ is greater than zero, as the reversible electrical machine 14 operates as an engine by absorbing electrical energy and by generating mechanical work. In particular, the power $P_B$, given by the product of the voltage $V_b$, of the current $I_b$ and of the inverse of the efficiency $\eta_M$, is greater than zero.

The optimal value $P_B^*$ of the discharge power $P_B$ of the battery 16 corresponds to the value that permits a minimization of the function [13] for a given value of the power $P_O$ of the output of the servo-assisted transmission. In correspondence to the optimal discharge power $P_B^*$, you obtain the optimal power value $P_E^*$ for the internal combustion engine 2 for the discharge of the battery 16 during the drive with power $P_O$ delivered.

Figure 13:
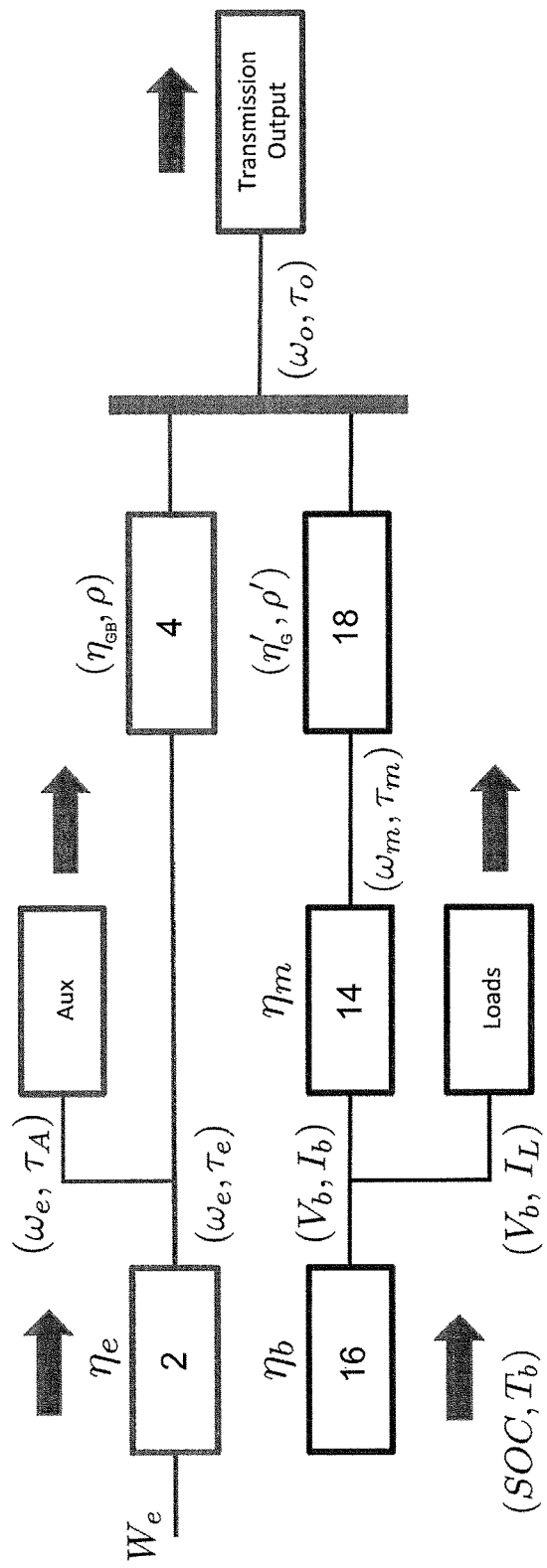

According to FIG. 13, on the other hand, taking into account the contribution of the internal combustion engine 2 and of the reversible electrical machine 14 operating as an engine by absorbing electrical energy and by generating mechanical work and taking into account the contribution of the auxiliary loads AUX and of the further electrical loads LOADS, three different situations can occur.

In the first case, the specific fuel consumption $BSFC_{DCHR}$ for the discharge of the battery 16 during the drive is defined as:

$$BSFC_{DCHR}(P_B, P_O) = \frac{G_E(\omega_E, \tau_E(\tau_O, I_B^{CHR}))}{P_A + P_O + P_L - \eta_B P_B} \quad [14]$$

Equation [14] applies in case the product of the power $P_B$ of the single cells making up the battery 16 and of the efficiency $\eta_B$ of the battery 16 is smaller than or equal to the power $P_L$ of the electrical loads of the hybrid vehicle, namely when the power delivered by the battery is, at the most, sufficient for supplying power to the electrical loads.

The optimal value $P_B^*$ of the discharge power $P_B$ of the battery 16 corresponds to the value that permits a minimization of the function [14] for a given value of the power $P_O$ of the output of the servo-assisted transmission.

In the second case, the specific fuel consumption $BSFC_{DCHR}$ for the discharge of the battery 16 during the drive is defined as:

$$BSFC_{DCHR}(P_B, P_O) = \frac{G_E(\omega_E, \tau_E(\tau_O, I_B^{CHR}))}{P_A + P_O - \eta_M \eta_G (\eta_B P_B - P_L)} \quad [15]$$

Equation [15] applies in case the product of the power $P_B$ of the single cells making up the battery 16 and of the efficiency $\eta_B$ of the battery 16 is grater than the power $P_L$ of the electrical loads of the hybrid vehicle and in case the following in equation is fulfilled:

$$\eta_M \eta_G (\eta_B P_B - P_L) \leq P_O \quad [16]$$

which defines the condition in which the power delivered by the battery is, at the most, sufficient for supplying power to the electrical loads and for the drive.

The optimal value $P_B^*$ of the discharge power $P_B$ of the battery 16 corresponds to the value that permits a minimization of the function [15] for a given value of the power $P_O$ of the output of the servo-assisted transmission.

In the third and last case, the specific fuel consumption $BSFC_{DCHR}$ for the discharge of the battery 16 during the drive is defined as:

$$BSFC_{DCHR}(P_B, P_O) = \frac{G_E(\omega_E, \tau_E(\tau_O, I_B^{DCHR}))}{P_A - \eta_{GB}(\eta_M \eta_G (\eta_B P_B - P_L) - P_O)} \quad [17]$$

which defines the condition occurring when the power delivered by the battery 16 is greater than what is necessary for supplying power to the electrical loads and for the drive.

The optimal value $P_B^*$ of the discharge power $P_B$ of the battery 16 corresponds to the value that permits a minimization of the function [16] for a given value of the power $P_O$ of the output of the servo-assisted transmission.

In correspondence to the optimal discharge power $P_B^*$ r, obtained in the three different cases by minimizing, respectively, the functions [14], [15] and [17] for a given value of the power PO of the output of the servo-assisted transmission, you obtain the optimal power value $P_E^*$ for the internal combustion engine 2 for the discharge of the battery 16 during the drive with power $P_O$ delivered.

In the first, in the second and in the third case discussed above, respectively, it is possible to define the following quantities:

$$P_O' = P_O + P_L - \eta_B P_B \quad [18]$$

$$P_O' = P_O - \eta_M \eta_G (\eta_B P_B - P_L) \quad [19]$$

$$P_O' = \eta_{GB}(P_O - \eta_M \eta_G (\eta_B P_B - P_L)) \quad [20]$$

Now equations [14], [15] and [17] can be changed by inserting quantity $P_O'$, which was defined in equations [18], [19] and [20]. Equations [14], [15] and [17] obtained by so doing can be all expressed in the following common form:

$$BSFC_{DCHR}(P_B, P_O) = \frac{G_E(\omega_E, \tau_E)}{P_A + P_O'} = BSFC_{PWT}(P_O') \quad [21]$$

The optimal value of the power $P_E$ of the internal combustion engine 2 corresponds to the value that permits a minimization of the function [12] for a given value of the power $P_O$ of the output of the servo-assisted transmission and for a given value of the power $P_B$ of the single cells making up the battery 16. Evidently, equation [21] corresponds to equation [10]. In other words, the optimal value of the power $P_E$ of the internal combustion engine 2 corresponds to the value that permits a minimization of the function of the specific fuel consumption BSFC of the auxiliary loads AUX and of the output of the servo-assisted transmission for a given value of the power $P_O'$.

In equations [14] to [21] $G_E, \eta_B, \eta_{GB}, \eta_G, \eta_M, \omega_E, P_O, P_L, P_A, I_b, \tau_E$ and $P_b$ have the meaning described above and the driving torque $\tau_E$ is determined as a function of the driving torque $\tau_O$ and if the current (in this case, the current $I_b$ is greater than zero, as the battery 16 delivers electrical energy).

Considering the generic configuration shown in FIG. 8, in which the reversible electrical machine 14 can act partly as an engine by absorbing electrical energy and by generating mechanical work and partly as a generator by absorbing mechanical work and by generating electrical energy and considering a partial charging cycle of the battery 16, consisting of two consecutive charge and discharge phases, the specific fuel consumption $BSFC_{CHR}$ for the charge cycle is defined as:

$$BSFC_{CHR}(P_B, P_O) = \quad [22]$$

$$\frac{\delta G_E(\omega_E, \tau_E(I_B^{DCHR})) + (1-\delta)G_E(\omega_E, \tau_E(I_B^{CHR}))}{P_A + P_O + P_L - P_B}$$

wherein $\delta$ is the "charge share" namely the time fraction in which the reversible electrical machine 14 operates as a generator by absorbing mechanical work and by generating electrical energy, whereas $1-\delta$ is the "discharge share" namely the time fraction in which the reversible electrical machine 14 operates as an engine by absorbing electrical energy and by generating mechanical work. As we are dealing, as a whole, with a charge cycle, equation [23] is applied in case the following inequation is fulfilled for the mean power $P_b$ of the cells of the battery 16:

$$P_B = V_B[\delta * I_B^{CHR} (1-\delta) * I_B^{DCHR}] < 0 \quad [23]$$

The specific fuel consumption $BSFC_{CHR}$ for the charge cycle is a function of a charge current $I_B^{CHR}$, of a discharge current $I_B^{DCHR}$ and of the power $P_B$ expressed by [23].

If, on the other hand, we consider a partial discharge cycle of the battery 16, always consisting of two consecutive charge and discharge phases, the specific fuel consumption $BSFC_{DCHR}$ for the discharge cycle is defined as follows:

$$BSFC_{DCHR}(P_B, P_O) = \quad [24]$$

$$\frac{\delta G_E(\omega_E, \tau_E(I_B^{DCHR})) + (1-\delta)G_E(\omega_E, \tau_E(I_B^{DCHR}))}{P_A + P_O - \eta_M \eta_G(\eta_B P_B - P_L)}$$

wherein $\delta$ and $(1-\delta)$ are defined as above, $I_B^{CHR}$ is the charge current and $I_B^{DCHR}$ is the discharge current of the battery 16.

Equation [24] is applied in the case of greatest interest, when condition [16] is fulfilled. Furthermore, as the cycle under examination is, as a whole, a discharge cycle, equation [24] is applied in case the following inequation is fulfilled for the mean power $P_B$ of the cells of the battery 16:

$$P_B = V_B[\delta * I_B^{CHR} + (1-\delta) * I_B^{DCHR}] > 0 \quad [25]$$

The optimal value of the charge current $I_B^{CHR}$ and the optimal value of the discharge current $I_B^{DCHR}$ correspond to the values that permit a minimization, respectively, of the functions [22] and [24] for a given value of the power $P_O$ of the output of the servo-assisted transmission and for a given value of the power $P_B$ of the single cells making up the battery 16.

According to a preferred variant, the "charge share" $\delta$, which represents the time fraction in which the reversible electrical machine 14 operates as a generator by absorbing mechanical work and by generating electrical energy, is calculated by means of the following ratio:

$$\delta = \frac{\frac{P_B}{V_B} - I_B^{DCHR}}{I_B^{CHR} - I_B^{DCHR}} \quad [26]$$

and is a function of the charge current $I_B^{CHR}$ of the battery 16, of the discharge current $I_B^{DCHR}$ of the battery 16 and of the total power $P_B$ of the cells making up the battery 16.

Similarly, if we consider the generic configuration shown in FIG. 8, the internal combustion engine 2 is designed both to exclusively generate a driving torque $\tau$ to be transmitted to the drive wheels and to supply power to the auxiliary loads AUX or to also provide a supplementary driving torque to be delivered to the reversible electrical machine 14, which operates ad a generator by absorbing mechanical work and by generating electrical energy. In the second case, the internal combustion engine 2 turns out to be overloaded by the power requested by the reversible electrical machine 14. Similarly to what we did before, let's consider an overload cycle consisting of two consecutive phases: a first overload phase with an overload by the reversible electrical machine 14 and a second boost phase in which the reversible electrical machine 14 boosts the internal combustion engine 2.

The specific fuel consumption $BSFC_{LOAD}$ during the overload cycle, in which the reversible electrical machine 14 operates, on an average, as a generator, thus overloading the internal combustion engine 2 relative to the request for generation of power for the drive, is defined as follows:

$$BSFC_{LOAD}(P_E, P_O) = \frac{\delta G_E(\omega_E, \tau_{LOAD}) + (1-\delta)G_E(\omega_E, \tau_{BOOST})}{P_{AUX} + P_O - P_B} \quad [27]$$

wherein δ is the "overload share" namely the time fraction in which the reversible electrical machine 14 operates as a generator by absorbing mechanical work and by generating electrical energy, whereas 1−δ is the "boost share" namely the time fraction in which the reversible electrical machine 14 operates as an engine by absorbing electrical energy and by generating mechanical work. The internal combustion engine 2 produces the driving torque $\tau_{LOAD}$ in the overload phase and the driving torque $\tau_{BOOST}$ in the boost phase.

Equation [27] is applied in case the control unit 13 orders the overload operating mode, namely when the following inequation is fulfilled for the mean power $P_E$ of the internal combustion engine 2:

$$P_E = \omega_E * [\delta * \tau_{LOAD} + (1-\delta) * \tau_{BOOST}] > P_{AUX} + P_O/\eta_{GB} \quad [28]$$

wherein the driving torques $\tau_{LOAD}$ and $\tau_{BOOST}$ as well as the "overload share" δ and the "boost share" 1−δ are defined as above, $\omega_E$ is the angular speed of the internal combustion engine 2, $P_{AUX}$ is the power requested by the auxiliary loads AUX, $P_O$ is the power on the output shaft of the servo-assisted transmission, and $\eta_{GB}$ is the efficiency of the transmission.

For the overload cycle described above, the optimal value of the driving torque $\tau_{LOAD}$ to be transmitted to the drive wheels during the overload phase and the optimal value of the driving torque $\tau_{BOOST}$ to be transmitted to the drive wheels during the boost phase of the internal combustion engine 2 correspond to the values that permit a minimization, respectively, of the function [27], for a given value of the power $P_O$ of the output of the servo-assisted transmission and for a given value of the mean power $P_E$ of the internal combustion engine 2, which fulfils [28].

Let's consider, instead, the case in which the internal combustion engine 2 is boosted by the reversible electrical machine 14, in a boost cycle that is similar to the overload cycle, but with the second boost action prevailing over the first action.

The specific fuel consumption $BSFC_{BOOST}$ during the boost cycle, in which the reversible electrical machine 14 operates, on an average, as an engine, thus boosting the internal combustion engine 2 relative to the request for generation of power for the drive, is defined as follows:

$$BSFC_{BOOST}(P_E, P_O) = \frac{\delta G_E(\omega_E, \tau_{LOAD}) + (1-\delta)G_E(\omega_E, \tau_{BOOST})}{P_{AUX} + P_O - \eta_M \eta_G P_B} \quad [29]$$

Equation [29] is applied in case the control unit 13 orders the boost operating mode, namely when the following inequation is fulfilled for the mean power $P_E$ of the internal combustion engine 2:

$$P_E = \omega_E * [\delta * \tau_{LOAD} \pm (1-\delta) * \tau_{BOOST}] < P_{AUX} + P_O/\eta_{GB} \quad [30]$$

In [29] and [30] the driving torques $\tau_{LOAD}$ and $\tau_{BOOST}$ as well as the "overload share" δ and the "boost share" 1−δ are defined as above, $\omega_E$ is the angular speed of the internal combustion engine 2, $P_{AUX}$ is the power requested by the auxiliary loads AUX, $P_O$ is the power on the output shaft of the servo-assisted transmission, and $\eta_M$, $\eta_G$ e $\eta_{GB}$ are the efficiencies of the reversible electrical machine 14, of the connection device 18 and of the servo-assisted transmission, respectively.

For the boost cycle described above, the optimal value of the driving torque $\tau_{LOAD}$ to be transmitted to the drive wheels during the overload phase and the optimal value of the driving torque $\tau_{BOOST}$ to be transmitted to the drive wheels during the boost phase of the internal combustion engine 2 correspond to the values that permit a minimization, respectively, of the function [29], for a given value of the power $P_O$ of the output of the servo-assisted transmission and for a given value of the mean power $P_E$ of the internal combustion engine 2, which fulfils [30].

According to a preferred variant, the "overload share" δ, which represents the time fraction in which the reversible electrical machine 14 operates as a generator by absorbing mechanical work and by generating electrical energy, is calculated by means of the following ratio:

$$\delta = \frac{\frac{P_E}{\omega_E} - \tau_{BOOST}}{\tau_{LOAD} - \tau_{BOOST}} \quad [31]$$

and is a function of the power $P_E$ of the internal combustion engine 2, of the angular speed $\omega_E$, of the driving torque $\tau_{LOAD}$ to be transmitted to the drive wheels during the overload phase, in which the internal combustion engine 2 provides a supplementary driving torque to be delivered to the reversible electrical machine 14, and of the driving torque $\tau_{BOOST}$ to be transmitted to the drive wheels during the boost phase, in which the internal combustion engine 2 is boosted by the driving torque produced by the reversible electrical machine 14.

The description above can find advantageous application in a hybrid drive vehicle with any type of parallel architecture.

For example, the description above can find advantageous application in an embodiment (not shown) of the vehicle, wherein the reversible electrical machine 14 is controlled by an electrical actuator 15, which is connected to at least one battery 16 designed to store electrical energy and comprises at least one shaft 17; the shaft 17 is integral to a rotor of the reversible electrical machine 14, cannot be mechanically connected either to the primary shaft 5 or to the secondary shaft 7 of the servo-assisted mechanical gearbox 4, and can be mechanically connected, by means of the connection device 18, to a differential, which transmits the motion to the further wheels by means of two respective axle shafts.

The description above can also find advantageous application in an embodiment (not shown) of the hybrid vehicle provided with two reversible electrical machine 14, each controlled by a respective electrical actuator 15; wherein the two electrical actuators 15 are connected to one another and to at least one respective battery 16 designed to store electrical energy. Each reversible electrical machine 14 comprises a shaft 17, which is integral to a rotor of the respective reversible electrical machine 14, is usually idle, and can be mechanically connected to the primary shaft 5 of the servo-assisted mechanical gearbox 4 by means of a respective connection device 18.

Both methods described above for the control of a hybrid vehicle with a parallel architecture (both in case of a known speed profile and in case of an unknown speed profile) have the advantage of permitting an optimization of the cumulative fuel consumption of the internal combustion engine 2, namely they allow the reversible electrical machine 14 and the internal combustion engine 2 to always operate in the best conditions, i.e. optimizing fuel consumptions and reducing polluting emissions.

Furthermore, the methods described above for the control of a hybrid vehicle with a parallel architecture are easy and cheap to be implemented in a control unit 13, as they do not require any physical changes and use a small calculation capacity of the control unit 13 itself.

The invention claimed is:

1. A method to control a hybrid vehicle with a parallel architecture and with an unknown speed profile, wherein the hybrid vehicle is provided with a drive system comprising an internal combustion engine, a servo-assisted transmission and a reversible electrical machine, which can act both as an engine by absorbing electrical energy and by generating output power to perform mechanical work to transmit a driving torque to the drive wheels and as a generator by absorbing mechanical work and by generating electrical energy; wherein the reversible electrical machine is connected to a storage system, which is designed to store electrical energy and provide electrical power; the method comprises the steps of:
    recognizing the operating mode of the hybrid vehicle, which is chosen among the plurality of possible operating modes below:
        the internal combustion engine transmits a driving torque to the drive wheels; or
        the internal combustion engine transmits a driving torque to the drive wheels and the reversible electrical machine operates as a generator by absorbing mechanical work and by generating electrical energy; or
        the internal combustion engine transmits a driving torque to the drive wheels, the reversible electrical machine operates as a generator by absorbing mechanical work and by generating electrical energy, and the contribution of auxiliary mechanical loads and of further electrical loads is taken into account; or
        the internal combustion engine transmits a driving torque to the drive wheels and the reversible electrical machine operates as an engine by absorbing electrical energy and by generating mechanical work to transmit a driving torque to the drive wheels; or
        the internal combustion engine transmits a driving torque to the drive wheels, the reversible electrical machine operates as an engine by absorbing electrical energy and by generating mechanical work to transmit a driving torque to the drive wheels, and the contribution of auxiliary mechanical loads and of further electrical loads is taken into account;
    determining a function of the specific fuel consumption of the drive system of the hybrid vehicle as a function of the operating mode of the hybrid vehicle;
    determining an optimal value of the electrical power of the storage system, which corresponds to the value that permits a minimization of said function of the specific fuel consumption of the drive system of the hybrid vehicle for a given value of the output power of the servo-assisted transmission, and
    determining an optimal value of a power of the internal combustion engine, which corresponds to a value that permits a minimization of said function of the specific fuel consumption of the drive system of the hybrid vehicle for the given value of the output power of the servo-assisted transmission;
    wherein, taking into account the sole contribution of the internal combustion engine transmitting the driving torque ($\tau_E$) to the drive wheels, the function of the specific fuel consumption (BSFC) of the drive system of the hybrid vehicle to be minimized for a given value of the power ($P_E$) of the internal combustion engine (2) is defined as follows:

$$BSFC(P_E) = \frac{G_E(\omega_E, \tau_E)}{P_E} \quad [8]$$

wherein
$G_E$=fuel flow rate of the internal combustion engine, which is a function of the angular speed ($\omega_E$) of the internal combustion engine and of the driving torque ($\tau_E$) transmitted to the drive wheels by the internal combustion engine; and
$P_E$=power of the internal combustion engine, resulting from the product of the angular speed ($\omega_E$) of the internal combustion engine and of the driving torque ($\tau_E$) transmitted by the internal combustion engine.

2. A method to control a hybrid vehicle with a parallel architecture and with an unknown speed profile, wherein the hybrid vehicle is provided with a drive system comprising an internal combustion engine, a servo-assisted transmission and a reversible electrical machine, which can act both as an engine by absorbing electrical energy and by generating output power to perform mechanical work to transmit a driving torque to the drive wheels and as a generator by absorbing mechanical work and by generating electrical energy; wherein the reversible electrical machine is connected to a storage system, which is designed to store electrical energy and provide electrical power; the method comprises the steps of:
    recognizing the operating mode of the hybrid vehicle, which is chosen among the plurality of possible operating modes below:
        the internal combustion engine transmits a driving torque to the drive wheels; or
        the internal combustion engine transmits a driving torque to the drive wheels and the reversible electrical machine operates as a generator by absorbing mechanical work and by generating electrical energy; or
        the internal combustion engine transmits a driving torque to the drive wheels, the reversible electrical machine operates as a generator by absorbing mechanical work and by generating electrical energy, and the contribution of auxiliary mechanical loads and of further electrical loads is taken into account; or
        the internal combustion engine transmits a driving torque to the drive wheels and the reversible electrical machine operates as an engine by absorbing electrical energy and by generating mechanical work to transmit a driving torque to the drive wheels; or the internal combustion engine transmits a driving torque to the drive wheels, the reversible electrical machine operates as an engine by absorbing electrical energy and by generating mechanical work to transmit a driving torque to the drive wheels, and the contribution of auxiliary mechanical loads and of further electrical loads is taken into account;

determining a function of the specific fuel consumption of the drive system of the hybrid vehicle as a function of the operating mode of the hybrid vehicle;

determining an optimal value of the electrical power of the storage system, which corresponds to the value that permits a minimization of said function of the specific fuel consumption of the drive system of the hybrid vehicle for a given value of the output power of the servo-assisted transmission, and determining an optimal value of a power of the internal combustion engine, which corresponds to a value that permits a minimization of said function of the specific fuel consumption of the drive system of the hybrid vehicle for the given value of the output power of the servo-assisted transmission, wherein, taking into account the contribution of the internal combustion engine transmitting a driving torque ($\tau_E$) to the drive wheels, taking into account the contribution of the reversible electrical machine operating as a generator by absorbing mechanical work and by generating electrical energy, and ignoring the contribution of auxiliary loads (AUX) and of further electrical loads (LOADS), the function of the specific fuel consumption (BSFC) for the recharging of the storage system during the drive to be minimized is defined as follows:

$$BSFC_{CHR}(P_B, P_O) = \frac{G_E(\omega_E, \tau_E(\tau_O, I_B^{CHR}))}{P_O - P_B} \quad [10]$$

wherein $G_E$=fuel flow rate of the internal combustion engine, which is a function of the angular speed ($\omega_E$) of the internal combustion engine and of the driving torque ($\tau_E$) transmitted to the drive wheels by the internal combustion engine;

$\tau_E$=driving torque transmitted by the internal combustion engine;

$P_O$=output power of the servo-assisted transmission;

pB=electrical power of the storage system; and $i_b^{CHR}$=current delivered by the storage system, smaller than zero when charging.

3. A method to control a hybrid vehicle with a parallel architecture and with an unknown speed profile, wherein the hybrid vehicle is provided with a drive system comprising an internal combustion engine, a servo-assisted transmission and a reversible electrical machine, which can act both as an engine by absorbing electrical energy and by generating output power to perform mechanical work to transmit a driving torque to the drive wheels and as a generator by absorbing mechanical work and by generating electrical energy; wherein the reversible electrical machine is connected to a storage system, which is designed to store electrical energy and provide electrical power; the method comprises the steps of:

recognizing the operating mode of the hybrid vehicle, which is chosen among the plurality of possible operating modes below:

the internal combustion engine transmits a driving torque to the drive wheels; or the internal combustion engine transmits a driving torque to the drive wheels and the reversible electrical machine operates as a generator by absorbing mechanical work and by generating electrical energy; or the internal combustion engine transmits a driving torque to the drive wheels, the reversible electrical machine operates as a generator by absorbing mechanical work and by generating electrical energy, and the contribution of auxiliary mechanical loads and of further electrical loads is taken into account; or the internal combustion engine transmits a driving torque to the drive wheels and the reversible electrical machine operates as an engine by absorbing electrical energy and by generating mechanical work to transmit a driving torque to the drive wheels; or the internal combustion engine transmits a driving torque to the drive wheels, the reversible electrical machine operates as an engine by absorbing electrical energy and by generating mechanical work to transmit a driving torque to the drive wheels, and the contribution of auxiliary mechanical loads and of further electrical loads is taken into account;

determining a function of the specific fuel consumption of the drive system of the hybrid vehicle as a function of the operating mode of the hybrid vehicle;

determining an optimal value of the electrical power of the storage system, which corresponds to the value that permits a minimization of said function of the specific fuel consumption of the drive system of the hybrid vehicle for a given value of the output power of the servo-assisted transmission, and determining an optimal value of a power of the internal combustion engine, which corresponds to a value that permits a minimization of said function of the specific fuel consumption of the drive system of the hybrid vehicle for the given value of the output power of the servo-assisted transmission, wherein, taking into account the contribution of the internal combustion engine transmitting a driving torque ($\tau_E$) to the drive wheels, taking into account the contribution of the reversible electrical machine operating as a generator by absorbing mechanical work and by generating electrical energy, and taking into account the contribution of auxiliary mechanical loads (AUX) and of further electrical loads (LOADS), the function of the specific fuel consumption (BSFC) for the recharging of the storage system during the drive to be minimized is defined as follows:

$$BSFC_{CHR}(P_B, P_O) = \frac{G_E(\omega_E, \tau_E(\tau_O, \tau_A, I_L, I_B^{CHR}))}{P_A + P_O + P_L - P_B} \quad [11]$$

$G_E$=fuel flow rate of the internal combustion engine, which is a function of the angular speed ($\omega_E$) of the internal combustion engine and of the driving torque ($\tau_E$) transmitted to the drive wheels by the internal combustion engine; and $\tau_E$=driving torque transmitted by the internal combustion engine;
$P_O$=output power of the servo-assisted transmission;
$P_L$=electrical power absorbed by the further electrical loads (LOADS) of the hybrid vehicle;
$P_A$=power absorbed by the auxiliary mechanical loads (AUX);
pB=electrical power of the storage system; and
$I_b^{CHR}$=current delivered by the storage system, smaller than zero when charging.

4. A method to control a hybrid vehicle with a parallel architecture and with an unknown speed profile, wherein the hybrid vehicle is provided with a drive system comprising an internal combustion engine, a servo-assisted transmission and a reversible electrical machine, which can act both as an engine by absorbing electrical energy and by generating output power to perform mechanical work to transmit a driving torque to the drive wheels and as a generator by absorbing mechanical work and by generating electrical energy; wherein the reversible electrical machine is connected to a storage system, which is designed to store electrical energy and provide electrical power; the method comprises the steps of:
  recognizing the operating mode of the hybrid vehicle, which is chosen among the plurality of possible operating modes below:
    the internal combustion engine transmits a driving torque to the drive wheels; or
    the internal combustion engine transmits a driving torque to the drive wheels and the reversible electrical machine operates as a generator by absorbing mechanical work and by generating electrical energy; or
    the internal combustion engine transmits a driving torque to the drive wheels, the reversible electrical machine operates as a generator by absorbing mechanical work and by generating electrical energy, and the contribution of auxiliary mechanical loads and of further electrical loads is taken into account; or
    the internal combustion engine transmits a driving torque to the drive wheels and the reversible electrical machine operates as an engine by absorbing electrical energy and by generating mechanical work to transmit a driving torque to the drive wheels; or
    the internal combustion engine transmits a driving torque to the drive wheels, the reversible electrical machine operates as an engine by absorbing electrical energy and by generating mechanical work to transmit a driving torque to the drive wheels, and the contribution of auxiliary mechanical loads and of further electrical loads is taken into account;
  determining a function of the specific fuel consumption of the drive system of the hybrid vehicle as a function of the operating mode of the hybrid vehicle;
  determining an optimal value of the electrical power of the storage system, which corresponds to the value that permits a minimization of said function of the specific fuel consumption of the drive system of the hybrid vehicle for a given value of the output power of the servo-assisted transmission, and
  determining an optimal value of a power of the internal combustion engine, which corresponds to a value that permits a minimization of said function of the specific fuel consumption of the drive system of the hybrid vehicle for the given value of the output power of the servo-assisted transmission, wherein, taking into account the contribution of the internal combustion engine transmitting a driving torque ($\tau_E$) to the drive wheels, taking into account the contribution of the reversible electrical machine operating as an engine by absorbing electrical energy and by generating mechanical work to transmit a driving torque to the drive wheels, and ignoring the contribution of auxiliary loads (AUX) and of further electrical loads (LOADS), the function of the specific fuel consumption (BSFC) for the discharging of the storage system during the drive to be minimized is defined as follows:

$$BSFC_{DCHR}(P_B, P_O) = \frac{G_E(\omega_E, \tau_E(\tau_O, I_B^{DCHR}))}{P_O - \eta_G \eta_M \eta_B P_B} \quad [12]$$

$G_E$=fuel flow rate of the internal combustion engine (2), which is a function of the angular speed ($\omega_E$) of the internal combustion engine and of the driving torque ($\tau_E$) transmitted to the drive wheels by the internal combustion engine; and
$\tau_E$=driving torque transmitted by the internal combustion engine;
$P_O$=output power of the servo-assisted transmission;
$P_B$=electrical power of the storage system;
$I_b^{DCHR}$=current delivered by the storage system, greater than zero when discharging; and
$\eta_M$, $\eta_G$, $\eta_B$=efficiency of the reversible electrical machine, of a connection device and of the storage system, respectively.

5. A method to control a hybrid vehicle with a parallel architecture and with an unknown speed profile, wherein the hybrid vehicle is provided with a drive system comprising an internal combustion engine, a servo-assisted transmission and a reversible electrical machine, which can act both as an engine by absorbing electrical energy and by generating output power to perform mechanical work to transmit a driving torque to the drive wheels and as a generator by absorbing mechanical work and by generating electrical energy; wherein the reversible electrical machine is connected to a storage system, which is designed to store electrical energy and provide electrical power; the method comprises the steps of:
  recognizing the operating mode of the hybrid vehicle, which is chosen among the plurality of possible operating modes below:
    the internal combustion engine transmits a driving torque to the drive wheels; or
    the internal combustion engine transmits a driving torque to the drive wheels and the reversible electrical machine operates as a generator by absorbing mechanical work and by generating electrical energy; or
    the internal combustion engine transmits a driving torque to the drive wheels, the reversible electrical machine operates as a generator by absorbing mechanical work and by generating electrical energy, and the contribution of auxiliary mechanical loads and of further electrical loads is taken into account; or
    the internal combustion engine transmits a driving torque to the drive wheels and the reversible electrical machine operates as an engine by absorbing electrical energy and by generating mechanical work to transmit a driving torque to the drive wheels; or the internal combustion engine transmits a driving torque to the drive wheels, the reversible electrical machine operates as an engine by absorbing electrical energy and by generating mechanical work to transmit a driving torque to the drive wheels, and the contribution of auxiliary mechanical loads and of further electrical loads is taken into account;

determining a function of the specific fuel consumption of the drive system of the hybrid vehicle as a function of the operating mode of the hybrid vehicle;

determining an optimal value of the electrical power of the storage system, which corresponds to the value that permits a minimization of said function of the specific fuel consumption of the drive system of the hybrid vehicle for a given value of the output power of the servo-assisted transmission, and determining an optimal value of a power of the internal combustion engine, which corresponds to a value that permits a minimization of said function of the specific fuel consumption of the drive system of the hybrid vehicle for the given value of the output power of the servo-assisted transmission, wherein, taking into account the contribution of the internal combustion engine transmitting a driving torque ($\tau_E$) to the drive wheels, taking into account the contribution of the reversible electrical machine operating as an engine by absorbing electrical energy and by generating mechanical work to transmit a driving torque to the drive wheels, and taking into account the contribution of auxiliary loads (AUX) and of further electrical loads (LOADS), the function of the specific fuel consumption (BSFC) for the discharging of the storage system during the drive to be minimized is defined as follows:

$$BSFC_{DCHR}(P_B, P_O) = \frac{G_E(\omega_E, \tau_E(\tau_O, I_B^{DCHR}))}{P_A + P_O + P_L - \eta_B P_B} \quad [13]$$

$G_E$=fuel flow rate of the internal combustion engine, which is a function of the angular speed ($\omega_E$) of the internal combustion engine and of the driving torque ($\tau_E$) transmitted to the drive wheels by the internal combustion engine; and $\tau_E$=driving torque transmitted by the internal combustion engine;

$P_O$=output power of the servo-assisted transmission;

$P_L$=electrical power absorbed by the further electrical loads (LOADS) of the hybrid vehicle;

$P_A$=power absorbed by the auxiliary mechanical loads (AUX);

$P_B$=electrical power of the storage system;

$I_b^{DCHR}$=current delivered by the storage system, greater than zero when discharging; and $\eta_B$ efficiency of the storage system.

6. A method according to claim 5, wherein the product of the electrical power ($P_B$) of the storage system and of the efficiency ($\eta_B$) of the storage system is smaller than or equal to the electrical power absorbed by the further electrical loads (LOADS) of the hybrid vehicle.

7. A method to control a hybrid vehicle with a parallel architecture and with an unknown speed profile, wherein the hybrid vehicle is provided with a drive system comprising an internal combustion engine, a servo-assisted transmission and a reversible electrical machine, which can act both as an engine by absorbing electrical energy and by generating output power to perform mechanical work to transmit a driving torque to the drive wheels and as a generator by absorbing mechanical work and by generating electrical energy; wherein the reversible electrical machine is connected to a storage system, which is designed to store electrical energy and provide electrical power; the method comprises the steps of:

recognizing the operating mode of the hybrid vehicle, which is chosen among the plurality of possible operating modes below:

the internal combustion engine transmits a driving torque to the drive wheels; or the internal combustion engine transmits a driving torque to the drive wheels and the reversible electrical machine operates as a generator by absorbing mechanical work and by generating electrical energy; or the internal combustion engine transmits a driving torque to the drive wheels, the reversible electrical machine operates as a generator by absorbing mechanical work and by generating electrical energy, and the contribution of auxiliary mechanical loads and of further electrical loads is taken into account; or the internal combustion engine transmits a driving torque to the drive wheels and the reversible electrical machine operates as an engine by absorbing electrical energy and by generating mechanical work to transmit a driving torque to the drive wheels; or the internal combustion engine transmits a driving torque to the drive wheels, the reversible electrical machine operates as an engine by absorbing electrical energy and by generating mechanical work to transmit a driving torque to the drive wheels, and the contribution of auxiliary mechanical loads and of further electrical loads is taken into account;

determining a function of the specific fuel consumption of the drive system of the hybrid vehicle as a function of the operating mode of the hybrid vehicle;

determining an optimal value of the electrical power of the storage system, which corresponds to the value that permits a minimization of said function of the specific fuel consumption of the drive system of the hybrid vehicle for a given value of the output power of the servo-assisted transmission, and determining an optimal value of a power of the internal combustion engine, which corresponds to a value that permits a minimization of said function of the specific fuel consumption of the drive system of the hybrid vehicle for the given value of the output power of the servo-assisted transmission, wherein, taking into account the contribution of the internal combustion engine transmitting a driving torque ($\tau_E$) to the drive wheels, taking into account the contribution of the reversible electrical machine operating as an engine by absorbing electrical energy and by generating mechanical work to transmit a driving torque to the drive wheels, and taking into account the contribution of auxiliary loads (AUX) and of further electrical loads (LOADS), the function of the specific fuel consumption (BSFC) for the discharging of the storage system during the drive to be minimized is defined as follows:

$$BSFC_{DCHR}(P_B, P_O) = \frac{G_E(\omega_E, \tau_E(\tau_O, I_B^{DCHR}))}{P_A + P_O - \eta_M \eta_G(\eta_B P_B - P_L)} \quad [14]$$

$G_E$=fuel flow rate of the internal combustion engine, which is a function of the angular speed ($\omega_B$) of the internal combustion engine and of the driving torque ($\tau_B$) transmitted to the drive wheels by the internal combustion engine; and $\tau_E$=driving torque transmitted by the internal combustion engine;

$P_O$=output power of the servo-assisted transmission;

$P_L$=electrical power absorbed by the further electrical loads (LOADS) of the hybrid vehicle;

$P_A$=power absorbed by the auxiliary mechanical loads (AUX);

$P_B$=electrical power of the storage system;

$I_b^{DCHR}$=current delivered by the storage system, greater than zero when discharging; and $\eta_M$, $\eta_G$, $\eta_B$=efficiency of the reversible electrical machine, of a connection device and of the storage system, respectively.

8. A method according to claim 7, wherein the product of the electrical power ($P_B$) of the storage system and of the efficiency ($\eta_B$) of the storage system is greater than the electrical power ($P_L$) absorbed by the further electrical loads (LOADS) of the hybrid vehicle and, at the same time, the following condition occurs:

$$\eta_M \eta_G (\eta_B P_B - P_L) \leq P_O \quad [15]$$

$P_O$ output power of the servo-assisted transmission;

$P_B$ electrical power of the storage system;

$P_L$ electrical power absorbed by the further electrical loads (LOADS) of the hybrid vehicle; and $\eta_M$, $\eta_G$, $\eta_B$, efficiency of the reversible electrical machine, of a connection device and of the storage system, respectively.

9. A method to control a hybrid vehicle with a parallel architecture and with an unknown speed profile, wherein the hybrid vehicle is provided with a drive system comprising an internal combustion engine, a servo-assisted transmission and a reversible electrical machine, which can act both as an engine by absorbing electrical energy and by generating output power to perform mechanical work to transmit a driving torque to the drive wheels and as a generator by absorbing mechanical work and by generating electrical energy; wherein the reversible electrical machine is connected to a storage system, which is designed to store electrical energy and provide electrical power; the method comprises the steps of:

recognizing the operating mode of the hybrid vehicle, which is chosen among the plurality of possible operating modes below:

the internal combustion engine transmits a driving torque to the drive wheels; or the internal combustion engine transmits a driving torque to the drive wheels and the reversible electrical machine operates as a generator by absorbing mechanical work and by generating electrical energy; or the internal combustion engine transmits a driving torque to the drive wheels, the reversible electrical machine operates as a generator by absorbing mechanical work and by generating electrical energy, and the contribution of auxiliary mechanical loads and of further electrical loads is taken into account; or the internal combustion engine transmits a driving torque to the drive wheels and the reversible electrical machine operates as an engine by absorbing electrical energy and by generating mechanical work to transmit a driving torque to the drive wheels; or the internal combustion engine transmits a driving torque to the drive wheels, the reversible electrical machine operates as an engine by absorbing electrical energy and by generating mechanical work to transmit a driving torque to the drive wheels, and the contribution of auxiliary mechanical loads and of further electrical loads is taken into account;

determining a function of the specific fuel consumption of the drive system of the hybrid vehicle as a function of the operating mode of the hybrid vehicle;

determining an optimal value of the electrical power of the storage system, which corresponds to the value that permits a minimization of said function of the specific fuel consumption of the drive system of the hybrid vehicle for a given value of the output power of the servo-assisted transmission, and determining an optimal value of a power of the internal combustion engine, which corresponds to a value that permits a minimization of said function of the specific fuel consumption of the drive system of the hybrid vehicle for the given value of the output power of the servo-assisted, wherein, taking into account the contribution of the internal combustion engine transmitting a driving torque ($\tau_E$) to the drive wheels, taking into account the contribution of the reversible electrical machine operating as an engine by absorbing electrical energy and by generating mechanical work to transmit a driving torque to the drive wheels, and taking into account the contribution of auxiliary loads (AUX) and of further electrical loads (LOADS), the function of the specific fuel consumption (BSFC) for the discharging of the storage system during the drive to be minimized is defined as follows:

$$BSFC_{DCHR}(P_B, P_O) = \frac{G_E(\omega_E, \tau_E(\tau_O, I_B^{DCHR}))}{P_A - \eta_{GB}(\eta_M \eta_G(\eta_B P_B - P_L) - P_O)} \quad [16]$$

$G_E$=fuel flow rate of the internal combustion engine, which is a function of the angular speed ($\omega_E$) of the internal combustion engine and of the driving torque ($\tau_E$) transmitted to the drive wheels by the internal combustion engine; and $\tau_E$=driving torque transmitted by the internal combustion engine;

$P_O$=output power of the servo-assisted transmission;

$P_L$=electrical power absorbed by the further electrical loads (LOADS) of the hybrid vehicle;

$P_A$=power absorbed by the auxiliary mechanical loads (AUX);

$P_B$=electrical power of the storage system;

$I_b^{DCHR}$=current delivered by the storage system, greater than zero when discharging; and $\eta_M$, $\eta_G$, $\eta_B$=efficiency of the reversible electrical machine, of a connection device, of a servo-assisted mechanical gearbox and of the storage system, respectively.

* * * * *

UNITED STATES PATENT AND TRADEMARK OFFICE
CERTIFICATE OF CORRECTION

PATENT NO. : 10,011,268 B2
APPLICATION NO. : 15/254594
DATED : July 3, 2018
INVENTOR(S) : Samuele Arcangeli et al.

Page 1 of 1

It is certified that error appears in the above-identified patent and that said Letters Patent is hereby corrected as shown below:

On the Title Page

Item (72), Lines 4-5, Inventors, the residence of inventor Andrea Balluchi listed as "San Giovanni Valdamo (IT)" should be changed to --San Giovanni Valdarno (IT)--.

Signed and Sealed this
Sixth Day of August, 2019

Andrei Iancu
*Director of the United States Patent and Trademark Office*